(12) United States Patent
Saitou et al.

(10) Patent No.: US 7,428,251 B2
(45) Date of Patent: Sep. 23, 2008

(54) CONTROL AND SUPERVISORY SIGNAL TRANSMISSION SYSTEM

(75) Inventors: Yoshitane Saitou, Nagaokakyo (JP); Kenji Nishikido, Nagaokakyo (JP); Yasushi Mori, Nagaokakyo (JP)

(73) Assignee: Anywire Corporation, Kyoto (JP)

( * ) Notice: Subject to any disclaimer, the term of this patent is extended or adjusted under 35 U.S.C. 154(b) by 742 days.

(21) Appl. No.: 10/932,363

(22) Filed: Sep. 1, 2004

(65) Prior Publication Data

US 2005/0054355 A1    Mar. 10, 2005

(30) Foreign Application Priority Data

Sep. 4, 2003    (JP)    .............................. 2003-312181

(51) Int. Cl.
*H04J 3/12*    (2006.01)
(52) U.S. Cl. ...................................... 370/527
(58) Field of Classification Search ................ 370/373, 370/377, 384, 385, 400–410, 529
See application file for complete search history.

(56) References Cited

U.S. PATENT DOCUMENTS 4,627,047 A * 12/1986 Pitroda et al. ............... 370/384
2005/0013310 A1 * 1/2005 Banker et al. ............... 370/401

FOREIGN PATENT DOCUMENTS

| JP | 64-72623 | 3/1989 |
| JP | 64-89839 | 4/1989 |
| JP | 3-6997 | 1/1991 |
| JP | 2003-199178 | 7/2003 |

* cited by examiner

*Primary Examiner*—Chi H. Pham
*Assistant Examiner*—Thai D. Hoang
(74) *Attorney, Agent, or Firm*—McGlew & Tuttle, P.C.

(57) ABSTRACT

An intermediate station transmits a supervisory signal sent form a given controlled device to a controlled device associate with the given device as a control signal. An intermediate-station input unit extracts a supervisory signal, which is a current signal superimposed on a signal transmitted through a data signal line, in every clock cycle. An intermediate-station output unit obtains the supervisory signal in every clock cycle, and outputs a control signal, which is a pulse-width-modulated voltage signal, onto the data signal line in the same clock cycle in which the supervisory signal has been extracted.

15 Claims, 16 Drawing Sheets

CONTROL AND SUPERVISORY SIGNAL TRANSMISSION SYSTEM

BACKGROUND OF THE INVENTION

1. Field of the Invention

This invention relates to a control and supervisory signal transmission system, and more particularly to a control and supervisory signal transmission system having a simple structure in which an intermediate station is provided in place of a controller and a parent station, wherein a parallel control signal from the intermediate station is converted into a serial signal and the serial signal is transmitted to a controlled unit in a remote device, wherein the serial signal is converted into a parallel signal to drive the device and a parallel supervisory signal of a sensor unit which detects the status of the device are converted into a serial signal and the serial signal is transmitted to the intermediate station, and wherein the serial signal is converted into a parallel signal and provided to the intermediate station, where the supervisory and control signals are superimposed on a clock signal having a power supply signal superimposed on it.

2. Description of the Related Art

In automatic control fields, technologies are widely used in which a controller such as a sequence controller, programmable controller, or computer sends a control signal to drive and control a large number of controlled devices (motors, solenoids, solenoid valves, relays, thyristors, and lamps, for example) at remote locations and supervisory signals are transmitted and provided from a sensor unit to detect a state of each device (the on/off state of read switches, microswitches, push-button switches, for example) to the controller.

In these technologies, a number of lines such as a power supply line, control signal line, and a ground line, are conventionally used to connect the controller with the controlled unit and with sensor units. With the downscaling of controlled devices in recent years, wiring in a high-density layout of components of the devices has become difficult, and space for wiring has reduced and become costly.

In order to solve these problems, various technologies have been proposed (in Japanese Patent Laid-Open No. 01-072623, No. 01-089839, and No. 03-006997, for example). According to the invention described in Japanese Patent Laid-Open No. 03-006997, an input unit and output unit are connected to a parent station and the parent station provides a clock signal superimposed on a power supply onto a common data signal line. Thus fast bidirectional signal transmission between the controller and the controlled units and between the controller and the sensor units can be achieved with a simple structure. That is, the system can be configured with a reduced number of lines, the costs of the wiring can be reduced, the connections in child stations can be simplified, and addresses can flexibly be allocated to the child stations, and therefore child stations can be flexibly added or deleted at any locations requiring addition or deletion of such child stations.

A control and supervisory signal transmission system has been proposed as an advanced version of this technology (Japanese Patent Laid-Open No. 2003-199178). According to that invention, a signal from the controller to controlled units (hereinafter called a control signal) and a signal from a sensor unit to the controller (hereinafter called a supervisory signal) can be superimposed on a clock signal. In particular, the control and supervisory signals can be provided onto a data signal line and transmitted bidirectionally at the same time. As a result, the need for providing separate periods for transmitting a control signal and supervisory signal on the data signal line can be eliminated, the signal transmission rate can be made twice as faster, and a control signal can be transmitted to small wiring spaces in controlled units to obtain a supervisory signal.

According to the control and supervisory signal transmission system described in Japanese Patent Laid-Open No. 2003-199178, control and supervisory signals can be transmitted between a parent station and child stations on various types of sites to adapt to an extremely wide range of requirements. However, at sites where it is desired that two power supply lines be eliminated by superimposing power supply on two data signal lines, a small system is often demanded.

We has investigated such demands and found that, in most sites where a small system is demanded, a system that transmits an input signal (supervisory signal) to a remote output device (controlled unit) in simple one-to-one correspondence, that is, a system that has a simple structure, is easy to maintain, and inexpensive, is demanded.

We has further studied and found that the controller and a parent station can be replaced with a simple structure when an input and output are transmitted in the same clock cycle (or period) in simple one-to-one correspondence as mentioned above and thus a small, easy-to-maintain, and inexpensive system can be achieved. Also, the inventor has found that the same clock cycle can be divided into two periods, an input period followed by an output period, and the input and output are superimposed on signals in the input period and output period to be transmitted, respectively, to achieve a simple structure that can replace the controller and a parent station can be adopted and thus a small, easy-to-maintain, and inexpensive system.

SUMMARY OF THE INVENTION

It is an object of the present invention to provided a control and supervisory signal transmission system that uses a simple structure in which an intermediate station is provided in place of the controller and a parent unit to superimpose supervisory and control signals on a clock signal having a power supply superimposed on it.

It is another object of the present invention to provide a control and supervisory signal transmission system that uses a simple structure in which an intermediate station is provided in place of the controller and a parent unit to superimpose a supervisory signal and a control signal on a clock signal having a power supply superimposed on it, in an input period and output period, respectively.

A control and supervisory signal transmission system according to the present invention includes a plurality of controlled devices each of which has a controlled unit and a sensor unit which supervises the controlled unit, and transmits a control signal to the controlled unit and also transmits a supervisory signal from the sensor unit through a data signal line common to the plurality of controlled devices. The system further includes an intermediate station which is connected to a data signal line and which transmits a supervisory signal sent from a given controlled device to a controlled device associated with the given controlled device as a control signal, and a plurality of child stations which is associated with the plurality of controlled devices and which is connected to the data signal line and controlled devices associated with controlled devices.

The intermediate station in the control and supervisory signal transmission system according to the present invention further includes timing generating means for generating a predetermined timing signal that is in synchronization with a clock having predetermined periodicity, an intermediate-station input unit, and an intermediate-station output unit. The intermediate-station input unit extracts a supervisory signal superimposed on a serial pulse voltage signal transmitted through the data signal line, in every cycle of the clock, under the control of the timing signal. The intermediate-station output unit obtains the supervisory signal as the control signal, superimposes the control signal on the serial pulse voltage signal according to each data value of the control signal in every cycle of the clock, and outputs the resulting signal onto the data signal line in the same cycle in which the supervisory signal has been extracted, under the control of the timing signal. Each of the plurality of child stations includes a child-station input unit and a child-station output unit. The child-station input unit generates a supervisory data signal according to a value from the sensor unit associated with the child station and superimposes the supervisory data signal on a predetermined position of the serial pulse voltage signal as a data value of the supervisory signal, under the control of the timing signal. The child-station output unit extracts data values of the control data signal from the serial pulse voltage signal and supplies data corresponding to the child station from among the data values to the controlled unit associated with the child-station output unit, in every cycle of the clock, under the control of the timing signal.

Furthermore, the intermediate station in the control and supervisory signal transmission system according to the present invention further includes a timing generating means for generating a predetermined timing signal that is in synchronization with a clock having predetermined periodicity, an intermediate-station input unit, and an intermediate-station output unit. The intermediate-station input unit extracts a supervisory data signal superimposed on a pulse voltage signal transmitted through the data signal line in an input period, in every cycle of the clock, under the control of the timing signal. The cycle is divided in at least the input period and an output period that follows the input period. The intermediate-station output unit obtains the supervisory signal as the control signal, superimposes the control data signal on the serial pulse voltage signal in the output period in every cycle of the clock, and outputs the resulting signal onto the data signal line, under the control of the timing signal. Each of the plurality of child station includes a child-station input unit and a child-station output unit. The child-station input unit generates a supervisory data signal according to a value from the sensor unit associated with the child station and superimposes the supervisory data signal on the serial pulse voltage signal in the input period of the clock at a predetermined position as a data value of the supervisory signal, under the control of the timing signal. The child-station output unit extracts data values of the control data signal superimposed on the serial pulse voltage signal in the output period in the cycle and supplies data corresponding to the child station from among the data values to the controlled unit associated with the child-station output unit, in every cycle of the clock, under the control of the timing signal.

According to the control and supervisory signal transmission system of the present invention, an intermediate station is provided in place of the controller and a parent station. The intermediate station transfers an input signal (supervisory signal) from a sensor unit to a remote controlled unit (output device) as a control signal in the same clock cycle in a simple one-to-one correspondence and also superimposes a power supply to the clock, thereby eliminating the need for a power line.

According to the control and supervisory signal transmission system of the present invention, an intermediate station is provided in place of the controller and a parent station. The intermediate station divides a clock cycle into an input period and an output period that follows the input period and superimposes an input signal (supervisory signal) from a sensor unit and a control signal to be transmitted to a remote controlled unit (output device) on the input period and output period, respectively, and also superimposes a power supply on the clock for transmission, thereby eliminating the need for a power line.

Thus, according to the present invention, a simple, small-scale, easy-to-maintain, and inexpensive control and supervisory signal transmission system that replaces the controller and parent station is provided. In the system, fast, (virtually) bidirectional signal transmission between a controlled unit and a sensor unit can be achieved and a supervisory signal and control signal can be outputted onto a common data signal line and transmitted bidirectional. In other words, in a simple, small-scale, easy-to-maintain, and inexpensive control and supervisory signal transmission system, the need for providing separate periods for transmitting a supervisory signal or control signal through a common data signal line can be eliminated and consequently the supervisory and control signals can be transmitted into small wiring space in a controlled device.

DETAILED DESCRIPTION OF THE PREFERRED EMBODIMENTS

Figure 1:
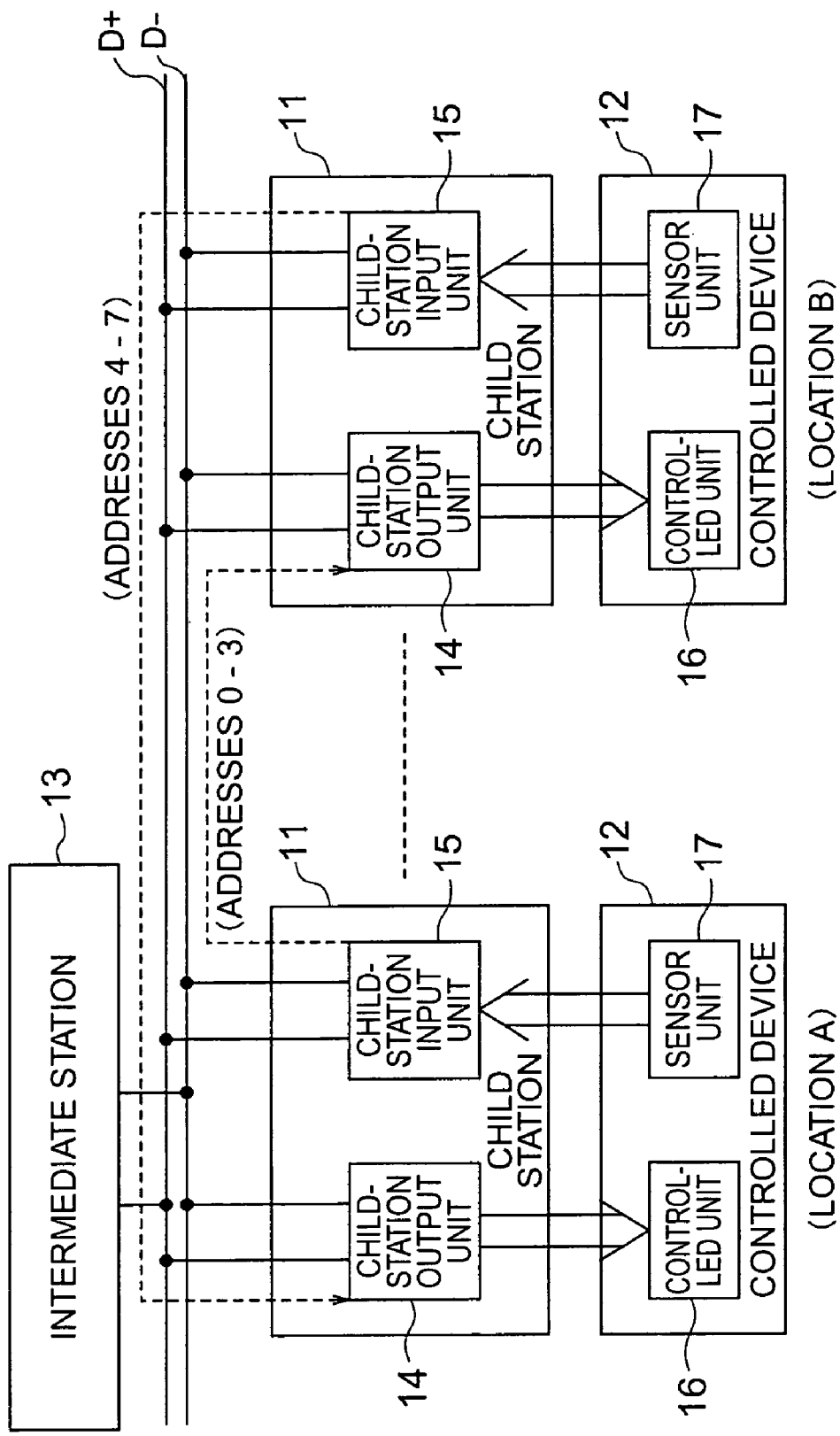
FIG. 1 is a block diagram showing a basic structure according to an embodiment of the present invention.
Figure 2:
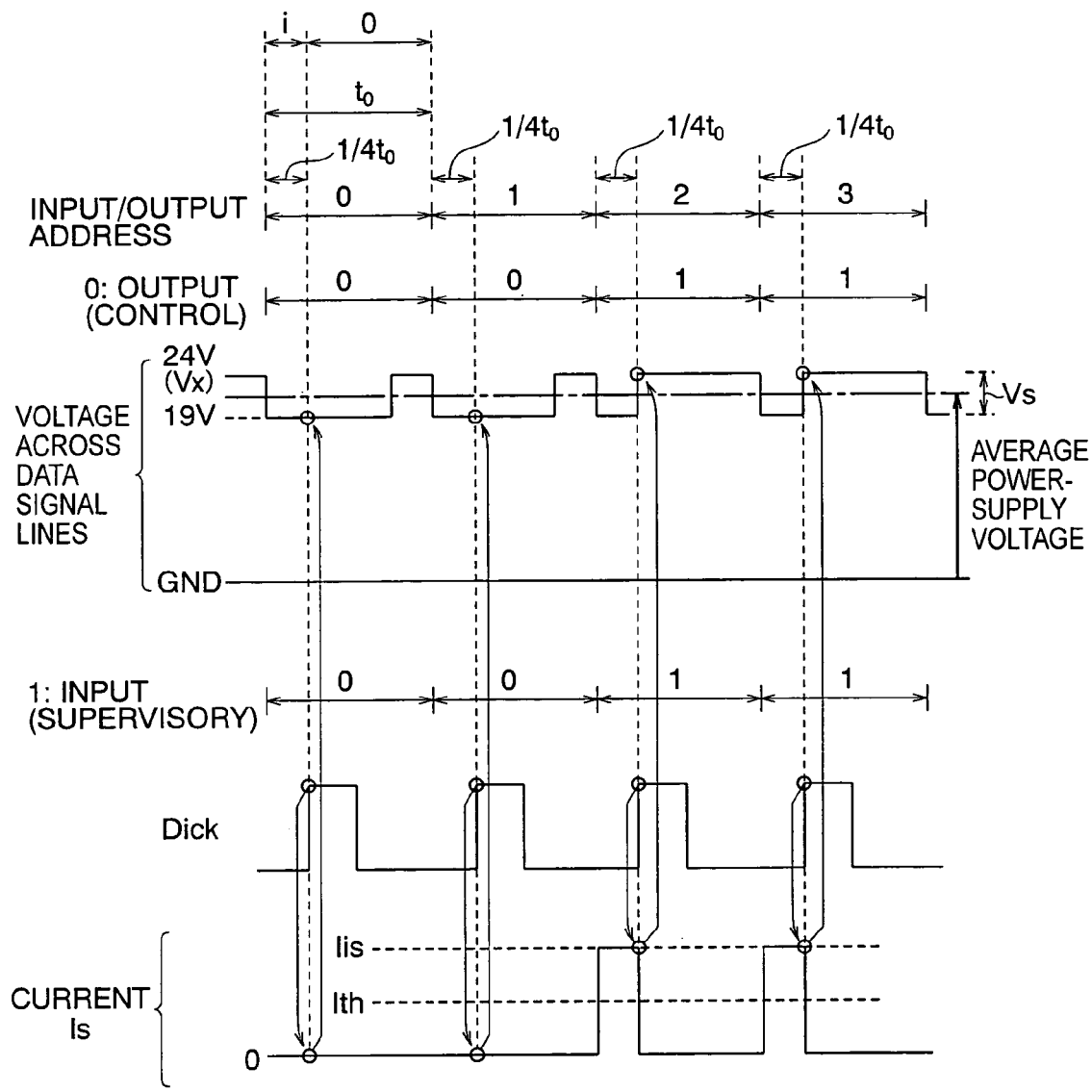
FIG. 2 is a diagram illustrating signal transmission according to an embodiment of the present invention.
Figure 3:
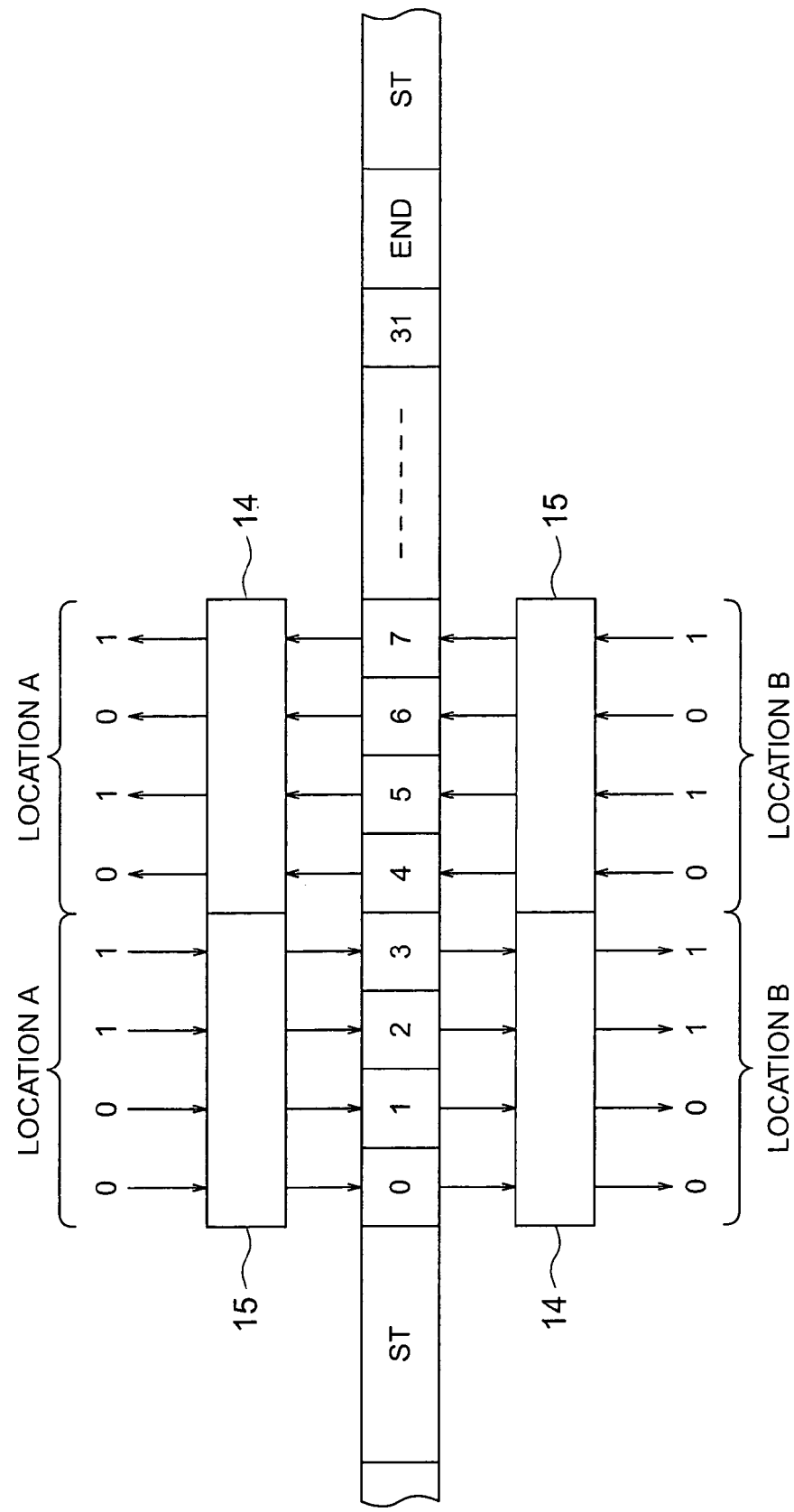
FIG. 3 is a diagram illustrating signal transmission according to the present invention.
Figure 4:
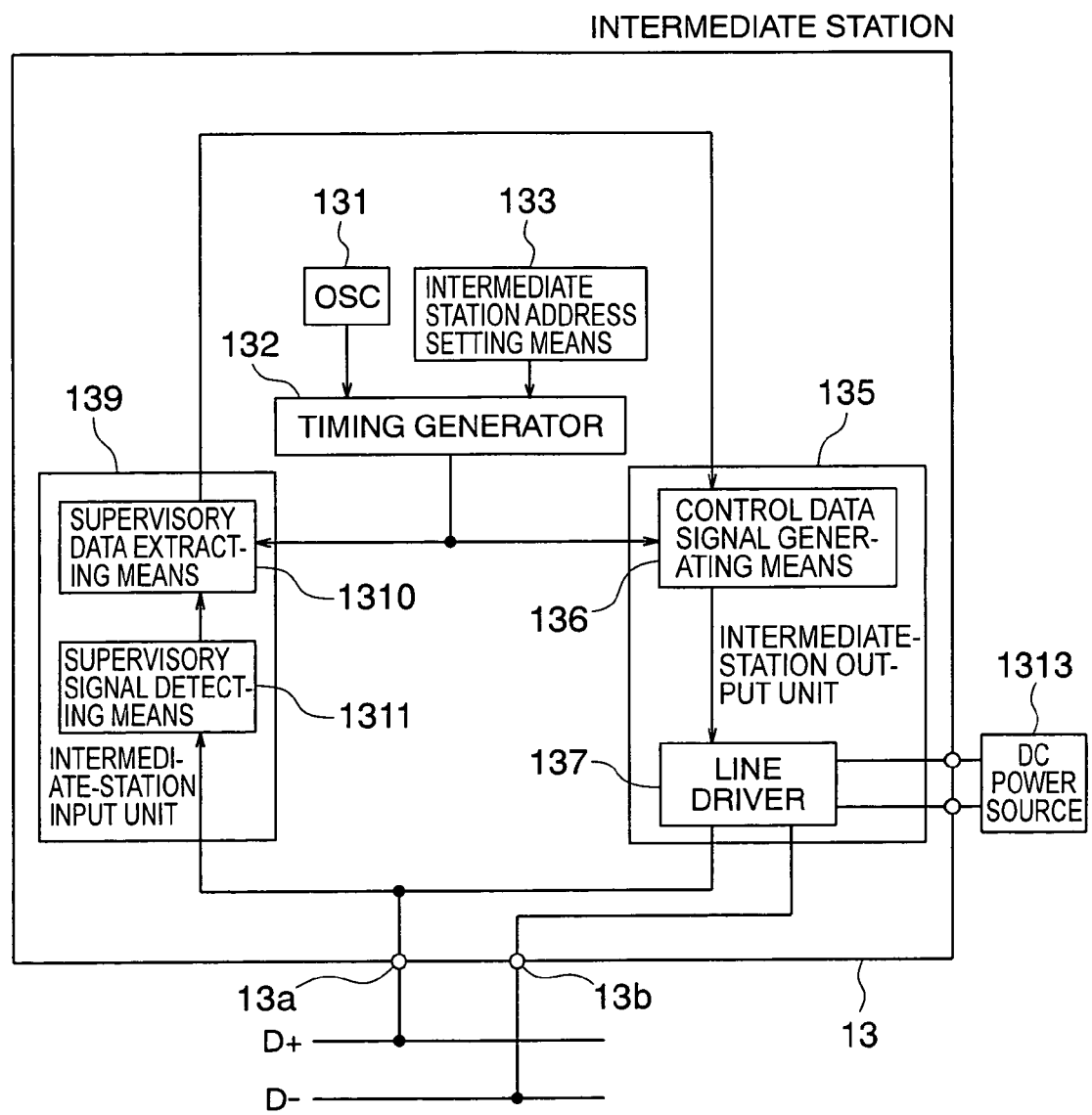
FIG. 4 is a block diagram showing a basic structure according to the present invention.
Figure 5:
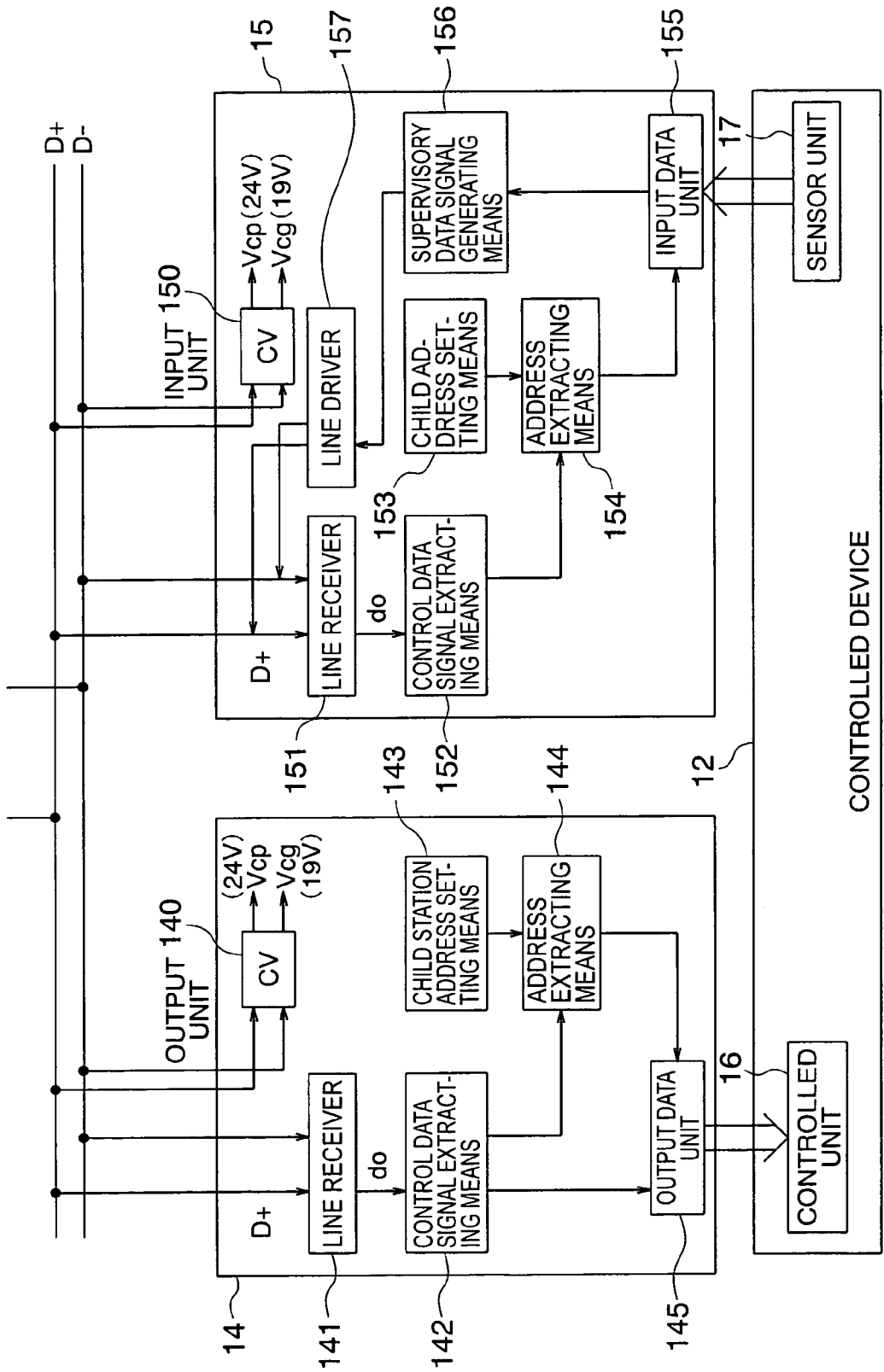
FIG. 5 is a block diagram showing a basic structure according to the present invention.

FIGS. 1, 4, and 5 are block diagrams showing a basic structure according to the present invention. FIGS. 2 and 3 are diagrams illustrating signal transmission according to an embodiment of the present invention. In particular, FIG. 1 shows a structure of a control and supervisory signal transmission system of the present invention, FIG. 4 shows a structure of its intermediate station, and FIG. 5 shows a structure of its child stations.

As shown in FIG. 1, the control and supervisory signal transmission system includes a number of controlled devices 12 each of which includes a controlled unit 16 and a sensor unit 17 for supervising the controlled unit 16. The control and supervisory signal transmission system does not include the controller such as a sequence controller, programmable controller, and computer. A controlled unit 16 and the sensor unit 17 are collectively referred to as a controlled device 12. The controlled unit 16 may be any of various components such as an actuator, (stepping) motor, solenoid, solenoid valve, relay, thyristor, and a lamp, which constitutes the controlled device 12. The sensor unit 17 may include a reed switch, microswitch, or a push-button switch, for example, which is chosen in accordance with the controlled unit 16, and outputs the on/off state (a binary signal).

The control and supervisory signal transmission system transmits a control signal to the controlled unit 16 through the data signal line common to the plurality of controlled devices 12 and also transmits a supervisory signal (sensor signal) from the sensor unit 17. The supervisory and control signals transmitted through the data signal line are serial signals. The data signal line has a first and second data signal lines D+ and D−. The line between the first data signal line D+ and the second data signal line D− is used for supplying a power-supply voltage Vx and a clock signal CK and bidirectionally (in effect) transmitting of supervisory and control signals.

This example does not include power lines P (24-V and 0-V power lines) for supplying the power-supply voltage Vx to each of the child stations 11 or a local power source. A power-supply signal superimposed on the clock signal supplies power to the child stations 11, as will be described later. The power capacity of the power-supply signal is large enough to operate each of the plurality of child stations 11.

To accomplish such signal transmission, the control and supervisory signal transmission system has the intermediate station 13 and the plurality of child stations 11 as shown in FIG. 1. The intermediate station 13 is connected to the data signal line. Unlike parent stations in well-known control and supervisory signal transmission systems, the intermediate station 13 does not receive a control signal from a controller or send a supervisory signal to a controller. Instead, the intermediate station 13 only transfer a supervisory signal received from (the sensor unit 17 of) a given controlled device 12 to (the controlled unit 16 of) a controlled device 12 associated with the former controlled device 12. Accordingly, the intermediate station 13 has a structure (see FIG. 4) different from well-known parent stations. The plurality of child stations 11 are associated with the plurality of controlled devices 12 and connected to the data signal line at given points and also connected to their associated controlled devices 12. Each of the child stations 11 includes a child-station output unit 14 and child-station input unit 15. A child-station output unit 14 and input unit 15 are correctively referred to as a child station 11. A child-station output unit 14 and input unit 15 are associated with controlled unit 16 and sensor unit 17, respectively. As shown in FIG. 1, a supervisory signal and a control signal input to and output from the child-station input unit 15 and the child-station output unit 14 are multiple-bit parallel signals. The child-station output unit 14 applies serial-parallel conversion to the control signal and the child-station input station 15 applies parallel-serial conversion to the supervisory signal.

The intermediate station 13 includes an intermediate-station output unit 135 and an intermediate-station input unit 139, as shown in FIG. 4. The intermediate station 13 also includes an oscillator (OSC) 131, timing generating means 132, and intermediate-station address setting means 133. The timing generating means 132 generates a predetermined timing signal that synchronizes to a clock CK with predetermined periodicity according to an oscillation output provided from the oscillator 131. The timing generating means 132 superimposes a power-supply voltage Vx on the generated clock CK. For that purpose, the timing generating means 132 has power-supply means 1313 for generating the power-supply voltage Vx at a predetermined level. For example, with a duty ratio of 50%, the first half of a cycle (or period) of the clock CK is set to "high-potential low level (19 V, for example)" and the latter half is set to the level of the power-supply voltage Vx (24 V, for example). The clock CK including the power-supply voltage is subjected to level conversion, then provided to terminals 13a and 13b and supplied to the first data signal line D+ and the second data signal line D− as will be described later. In other words, it is outputted as a relative potential difference between the two lines. A power-supply means 1313 in practice is connected to a line driver 137. The clock CK with the power-supply voltage outputted from the timing generating means 132 in practice is inputted into the intermediate-station output unit 135 and the intermediate-station input unit 139.

Signals on the first and second data signal lines D+ and D− are taken into the intermediate-station input unit 139. The intermediate-station input unit 139 includes supervisory signal detecting means 1311 and a supervisory data extracting means 1310. The supervisory signal detecting means 1311 captures current signals on the first and second data signal lines D+ and D− and detects and outputs a supervisory data signal (current signal) superimposed on them. The supervisory data extracting means 1310 (after performing waveform shaping) outputs the detection output in synchronization with the clock CK including the power supply voltage from the timing generating means 132. That is, the supervisory data extracting means 1310 outputs a serial data stream consisting of supervising data signals to a control data signal generating means 136.

As shown in FIG. 2, the intermediate-station input unit 139, under the control of the timing signal, detects a supervisory data signal superimposed on a serial pulse voltage signal transmitted through the data signal line each clock CK cycle as the presence or absence of a current signal Iis. For that purpose, a signal Dick that triggers detection is produced by the timing generating means 132, which will be detailed later. The signal Dick is a pulse whose rising edge is delayed from the clock CK by ¼ period (¼ t0, where t0 is one cycle of the clock CK). Thus, each data value in the serial supervisory signal is extracted, converted into a supervisory signal, and then provided to the control data signal generating means 136. When the data value in the supervisory data signal is "0011," the output (detected current) from the supervisory signal detecting means 1311 will be as shown in FIG. 2. As will be describe later, Ith denotes a threshold current for the supervisory signal detecting means 1311 of FIG. 8 and Iis denotes a supervisory data signal. The value of Ith is smaller than that of Iis.

At each rising edge of the signal Dick, in other words, after a lapse of ¼ t0 in each cycle of the clock CK, the presence or absence (on/off) of the supervisory signal is detected. When the current Iis, which is the supervisory signal, is smaller than Ith at that timing, the supervisory signal is in the off state or "0" (of the binary signal). Otherwise, the supervisory signal is in the on state or "1" (of the binary signal).

Because a control signal to be distributed to the plurality of child stations 11 is transmitted from the single intermediate station 13 through the data signal line as a serial signal (serial pulse voltage signal) as described above, an address count method is used for distributing the control signal. This means that the total number of data values of the control data signal to be sent (distributed) to the child stations 11 can be known in advance. Therefore, one address is allocated to each of all the data values of the control data signal. The child station 11 extracts clocks CK from the serial pulse voltage signal and counts them. When the child station 11 encounters one or more addresses allocated to control data signal data that the child station 11 should receive, it obtains the data value in the serial pulse voltage signal at that point as the control signal. In order to generate the end signal, the last address is allocated to the intermediate station 13.

In order to determine the timing of beginning and end of address counting, a start signal and end signal are generated. Before outputting a serial pulse voltage signal, the timing generating means 132 in the intermediate station 13 generates a start signal and provides it onto the first data signal line D+. The start signal is longer than one cycle of the clock CK so that it can be distinguished from the control signal. The intermediate-station address setting means 133 holds addresses allocated to the intermediate station 13. The intermediate station 13 counts clocks CK extracted from the serial pulse voltage signal and extracts the address allocated to it and, at that point, outputs the end signal onto the first data signal line D+. The end signal is longer than one cycle of the clock CK and shorter than the start signal.

The intermediate-station output unit 135 includes control data signal generating means 136 and a line driver 137. The control data signal generating means 136 superimposes on the clock CK, including the power supply voltage, each data value in a serial data string from the data supervisory data extracting means 1310, rather than data from the controller (not provided in the present invention). The output from the control data signal generating means 136 is provided onto the first and second data signal lines D+ and D− through the line driver 137, which is an output circuit.

As shown in FIG. 2, the intermediate-station output unit 135 changes, every cycle t0 of the clock CK, the duty ratio between a period during which a voltage level different from the predetermined power-supply voltage Vx is provided and the subsequent period during which the power-supply voltage Vx is provided, according to each data value in the control data signal under the control of a timing signal, thereby converting the control data signal into a serial pulse voltage signal and providing it onto the data signal line.

The voltage level different from the level of the power-supply voltage Vx is a "high-potential low level," for example, which is lower (in absolute value) than the power-supply voltage but higher (in absolute value) than the high-level signal in the other circuit components. When Vx=24 V, the "high-potential low level" may be 19 V, for example. That is, it is well higher than a CMOS high-level signal of 5 V in the other circuit components (for example a CMOS logic circuit). Because the potential difference Vs between the high level and low level of the clock, which is a pulse voltage, is 5 V, they can be made well distinguishable from each other by setting the threshold to an intermediate value between them (21.5 V, when D− is the reference level). In other words, the potential difference Vs is equal to a CMOS logic amplitude in the other circuit components (for example a CMOS logic circuit). Therefore, the serial pulse voltage signal can be considered as a signal that is obtained by level-shifting a clock having a duty ratio of 50% and the potential difference Vs and applying pulse-width modulation to the resulting signal according to the control data signal. Using the clock which is pulse-width modulated and whose amplitude is limited at the high potential, the average power-supply voltage achieved by an average power transmitted becomes as high as +21.5 V, which is about the intermediate value of the amplitude as indicated by the alternate long and short dashed line in FIG. 2. Therefore, a power capacity large enough to operate each of the plurality of child stations 11 can be transmitted to them even though the power line P is omitted, as described above.

In order to change the serial pulse voltage signal on the data signal line as described above, one of two methods can be used. According a first method, the potential on the first data signal line D+ is oscillated between the power-supply voltage Vx=24 V, which is the highest potential and the high-potential low level, 19 V, and the potential on the second data signal line D− is maintained at a ground level, according to the value of the control data signal. Alternatively, the potential on the firs data signal line D+ may be oscillated between 0 V and −5 V and the potential on the second data signal line D− may be kept at the lowest potential of −24 V. According to a second method, the potential on the first data signal line D+ is forced to the ground level, which is the highest potential, and the potential on the second data line D− is oscillated between the lowest potential, power-supply voltage Vx=−24 V, and "the high-potential (high in absolute value) low level" of −19 V, according to the value of the control data signal. Alternatively, the potential on the first data signal line D+ may be the highest potential of +24 V and the potential on the second data line D− may be oscillated between +5 V and 0 V. The waveform diagram in FIG. 9 indicates this example. In either case, the above-mentioned relative potential difference between the first and second data signal lines D+ and D− can be achieved.

Conventionally, the power-supply voltage Vx is 24 V but the amplitude obtained through amplitude modulation of a control signal was binary value, 12 V and 0 V. Accordingly, the average power-supply voltage provided by the average power transmitted by a conventional clock was as low as 12 V at the highest. Therefore, conventionally when a power line P were omitted, not all of the child stations 11 would be able to be operated unless the number of child stations 11 is limited. This is not realistic and in practice the power line P must be provided, rather than limiting the number of child stations 11.

The intermediate-station output unit 135 in FIG. 2 forces the signal level of the clock to the high-potential low level in its first ¾ periods and to the power-supply voltage Vx level in the remaining ¼ period of the clock, when the data value of the control data signal is "0." On the other hand, when the data value of the control data signal is "1," the intermediate-station output unit 135 forces the level of the clock to the high-potential low level in its first ¼ period and to the power-supply voltage Vx level in the remaining ¾ periods of the clock. In other words, the duty ratio of the clock is changed according to the data value of the control data signal. Thus, the parallel control data signal is converted into a serial pulse voltage signal, which is then provided onto the data signal line. Therefore, when the data value of the control data signal is "0011," the output from the control data signal generating means 136 will be as shown in FIG. 2 (a supervisory data signal, which will be described later, is excluded from the output.) An address (input/output address) is allocated to each cycle of the clock CK.

At the leading edge of the signal Dick, namely, after a laps of ¼ t0 of each cycle of the clock CK, the control signal is turned on or off in accordance with the on or off state of the supervisory signal. That is, pulse-width modulation is applied to the control signal. When the supervisory signal is in the off state at this timing, the pulse width (the period in which the signal is at high-potential low level, 19 V) of the signal Pck (the output signal to the data signal lines D+ and D−) is extended. That is, the control signal is maintained at "the high-potential low level" in remaining period of the cycle as well so that the pulse width becomes ¾ t0. On the other hand, when the supervisory signal is in the on state (Iis is 25 mA or higher) at that timing, the pulse width is reduced. That is, the level of the control signal in the period is forced to rise to the power-supply voltage Vx so that the pulse width becomes ¼ t0.

Other pulse-widths may be chosen for the pulse-width-modulation of the control signal. For example, inversely to example above, the pulse width may be reduced (to ¼ t0) when the supervisory signal is in the off state and may be extended (to ¾ t0) when the supervisory signal is in the on state.

As has been described, each cycle (t0) of the clock CK in the control and supervisory signal transmission system is divided into at least two, an input period (i) followed by an output period (o), as shown in FIG. 2. The intermediate-station input unit 139 extracts the supervisory data signal superimposed on signals being transmitted through the data signal lines D+ and D− in an input period. The intermediate-station output unit 135 obtains the supervisory signal as a control signal. In an output period, it superimposes the control data signal on the serial pulse voltage signal and outputs it onto the data signal lines D+ and D−. In this example, the supervisory signal, which is a current signal (I), is superimposed on the clock including the power-supply voltage Vx in the input period (i), which is the first ¼ t0 of each cycle of the clock, and the pulse-width-modulated control signal is superimposed on the clock in the output period (o), which is the next ½ t0 of the cycle, which will be described later in further detail in FIG. 12A.

A child-station input unit 15 includes a power-supply-voltage generating means (CV) 150, a line receiver 151, control data signal extracting means 152, child-station address setting means 153, address extracting means 154, an input data unit 155, supervisory data signal generating means 156, and a line driver 157, as shown in FIG. 5.

As can be seen from FIG. 5, the power-supply-voltage generating means 150, line receiver 151, control data signal extracting means 152, child-station address setting means 153, and address extracting means 154 have same structure and operate in substantially the same manner as the structure of the power-supply-voltage generating means 140, line receiver 141, control data signal extracting means 142, child-station address setting means 143, and address extracting means 144. Like the power-supply-voltage generating means 140, the power-supply-voltage generating means 150 electrically drives the circuits making up the child-station input unit 15 and generates power-supply voltages at predetermined levels, that is, an output Vcg (19 V) and an output Vcp (24 V), from the first and second data signal lines D+ and D− to electrically drive a sensor unit 17 in an associate controlled device 12.

The input data unit 155 holds a supervisory signal consisting of one or more (bit) data values provided from the associated sensor unit 17. When an address is inputted from the address extracting means 154, the input data unit 155 provides one or more data values it holds to the supervisory data signal generating means 156 in a predetermined order as a serial signal. In other words, the input data unit 155 performs parallel-serial conversion of the supervisory signal. The supervisory signal generating means 156 outputs a supervisory data signal according to the data value of the supervisory signal. The supervisory data signal from the supervisory data signal generating means 156 is provided to onto the first and second data signal lines D+ and D− through the line driver 157, which is an output circuit. Consequently, the supervisory data signal is superimposed on the data value of the control signal outputted on the first and second data signal lines D+ and D− at that time point. That is, the supervisory data signal is superimposed at the position of the data in a serial pulse voltage signal of that is associated with the child station 11. In other words, the data value of the supervisory signal that is associated with the same address is superimposed on the data value of the control signal that is associated with the same address.

As shown in FIG. 2, the child-station input unit 15, under the control of a timing signal, generates a supervisory data signal of binary levels different from the power-supply voltage according to a value from the associated sensor unit 17 and superimposes it at a predetermined position of the serial pulse voltage signal as a data value of the supervisory signal. For example, when the data value of the supervisory data signal is "1," a supervisory data signal is generated and superimposed at a predetermined position in one cycle of the clock CK. When the data value is "0," no supervisory data signal is generated nor superimposed. Accordingly, when the data value of the supervisory data signal is "0011," the output (detection current) of the supervisory signal detecting means 1311 after the supervisory data signal is superimposed by the line driver 157 will be as shown in FIG. 2.

The child-station output unit 14 includes a power-supply-voltage generating means (CV) 140, a line receiver 141, a control data signal extracting means 142, child-station address setting means 143, address extracting means 144, and an output data unit 145, as shown in FIG. 5.

The power-supply-voltage generating means (CV) 140 generates power-supply voltage at predetermined levels from the data signal lines. In particular, voltages on the first and second data signal lines D+ and D− are smoothed and stabilized by well-known means to obtain outputs Vcg (19 V) and Vcp (24 V). The output Vcg (19 V) provides a power-supply voltage of 5 V (corresponding to Vcc) with respect to the reference voltage, the output Vcp (24 V). This power-supply voltage is used to electrically drive a low-power-consumption circuit (for example an LED indicator circuit) associated with the child-station output unit 14 and to electrically drive the controlled unit 16 of the controlled device 12. In other words, while not shown in FIG. 5, the power-supply voltage generating means 140 supplies power to the corresponding controlled unit 16.

The line receiver 141, which is an input circuit, obtains a signal transmitted through the first and second data signal lines D+ and D− and provides it to the control data signal extracting means 142. The control data signal extracting means 142 extracts a control data signal from that signal and provides it to the address extracting means 144 and the output data unit 145. The station's address setting means 143 holds the address of the child station that is allocated to the child-station output unit 14. The address extracting means 144 extracts an address that matches the station's address held in the child-station address setting means 143 and provides it to the output data unit 145. When the address is provided from the address extracting means 144, the output data unit 145 outputs as a parallel signal one or more data values held at that time point in a (serial) signal being transmitted through the first and second data signal lines D+ and D− to the associated controlled unit 16. In other words, the output data unit 145 performs serial-parallel conversion of the control signal.

As shown in FIG. 2, in each cycle of the clock CK, the child-station output unit 14 under the control of a timing signal identifies the duty ratio between a period in which the serial pulse voltage signal is at a level ("high-potential low level") different from the power-supply voltage and the subsequent period in which it is at the power-supply voltage Vx. The child-station output unit 14 extracts each data value in the control data signal and provides a data value among the data values that is associated with the child station to the associated controlled unit 16. For example, when the first ¾ periods of the clock CK is at the high-potential low level, "0" is extracted as the data value of the original control data signal. When the remaining ¼ period is at the high-potential low level, "1" is extracted as the data value of the original control data signal. Consequently, when the serial pulse voltage signal is as shown in FIG. 2, a data value "0011" in the control data signal is extracted. Then the child-station output unit 14 provides the data among the data values that are associated with the child station 11 to the corresponding controlled unit 16.

In summary, as shown in FIG. 3, in the control and supervisory signal transmission system, an input signal (supervisory signal) from a sensor unit 17 and an output signal (control signal) provided to a controlled unit 16 are brought into one-to-one correspondence.

For example, a (for example 4-bit) supervisory signal "0011" is provided from the sensor unit 17 in a controlled device 12 at location A to the child-station input unit 15 in a child station 11 associated with the controlled device 12. For example four addresses 0 to 3 are allocated to the sensor unit 17 (actually the associated child-station input unit 15) at location A. The child-station input unit 15 superimposes the supervisory signal "0011" on the positions in the clock CK that are associated with addresses 0 to 3 and provides it onto the data signal lines D+ and D−, as indicated by a dashed line in FIG. 1. The intermediate-station input unit 139 in the intermediate station 13 extracts the supervisory signal "0011" and inputs it into the intermediate-station output unit 135 as a control signal "0011." The intermediate-station output unit 135 superimposes the control signal at the positions associated with the same addresses 0 to 3 from which the signal "0011" is extracted and provides it onto the data signal lines D+ and D−. Four addresses 0 to 3, for example, are allocated to the controlled unit 16 a controlled device 12 (actually the associated child-station output unit 14) at location B remote from location A. The child-station output unit 14 at location B extracts the control signal "0011" superimposed at the positions of addresses 0 to 3, as indicated by a dashed line in FIG. 1, and provides it to the associate controlled unit 16 at location B. Thus, the signal is outputted and inputted between the child-station input unit 15 in the child station 11 and the child-station output unit 14 in the other child station 11, which has the same addresses with each other.

Then, a supervisory signal ("0101," for example) is provided from the sensor unit 17 of the controlled device 12 at location B (not limited to this, instead, it may be location C, for example) to its associated child-station input unit 15 (having addresses 4 to 7, for example). The child-station input unit 15 superimposes the supervisory signal on the address 4-7 positions in the clock CK and outputs it onto the data signal lines D+ and D−, as indicated by a dashed line in FIG. 1. The intermediate-station input unit 139 in the intermediate station 13 extracts the supervisory signal and inputs it to the intermediate-station output unit 135 as a control signal. The intermediate-station output unit 135 superimposes the control signal on the address 4-7 positions and provides it onto the data signal lines D+ and D−. The child-station output unit 14 at location A to which addresses 4 to 7 are allocated extracts the control signal superimposed on the address 4 to 7 positions and provides it to its associated controlled unit 16 at location A, as indicated by a dashed line in FIG. 1.

In this way, one cycle (addresses 0 to 31, namely from the start signal ST to the end signal END) of control and supervisory signal transmission is performed. The signal transmission cycle is repeated as a unit. During the transmission, a signal from the child-station input unit 15 having given addresses is transmitted to the child-station output unit 14 having the same addresses in the same cycle of the clock CK. This means that the addresses (input addresses) in a supervisory signal in a transmission cycle are the same as the addresses (output addresses) in a control signal (hence called the input/output addresses). Therefore, simply by providing an input signal to the child station 11, an output signal can be transmitted (provided) to the corresponding child station 11 (having the same addresses).

As can be seen from the foregoing description, an input signal (the supervisory signal from the sensor unit 17) and an output signal (the control signal to the controlled unit 16) are simply brought into one-to-one correspondence and transmitted in the control and supervisory signal transmission system. Consequently, a simple and therefore easy-to-maintain and low-cost structure in which a controller and a parent station, which have been conventionally used, are not used can be achieved. Furthermore, an output signal, which is a pulse-width-modulated signal, is controlled by an input signal, which is a current signal, for each input/output address in a transmission cycle. Thus, bidirectional transmission of the input and output signals in effect can be performed (actually, it is not bidirectional at the moment of transmission as will be described later), and a power line can be omitted.

Furthermore, using a current signal as the supervisory signal and a pulse-width-modulated voltage signal as the control signal (the combination of the current-modulated supervisory signal and the pulse-width-modulated control signal) as in the above example allows a reliable transmission control system to be provided in an adverse environment such as a manufacturing factory with a high voltage noise level.

The correspondence between the input signal and the output signal is not limited to the above-described one-to-one. Instead, various correspondences may be used. For example, in the a where an input signal from a child-station input unit 15 at location A is provided to a child-station output unit 14 at location B as an output signal, an input signal from the child-station input unit 15 at location B may be provided to a child-station output unit 14 at location C as an output signal, besides providing an input signal from a child-station input unit 15 at location B to a child-station output unit 14 at location A as an output signal. Also, an input signal from the child-station input unit 15 at location A may be provided to the child-station output units 14 at locations B and C.

Figure 6:
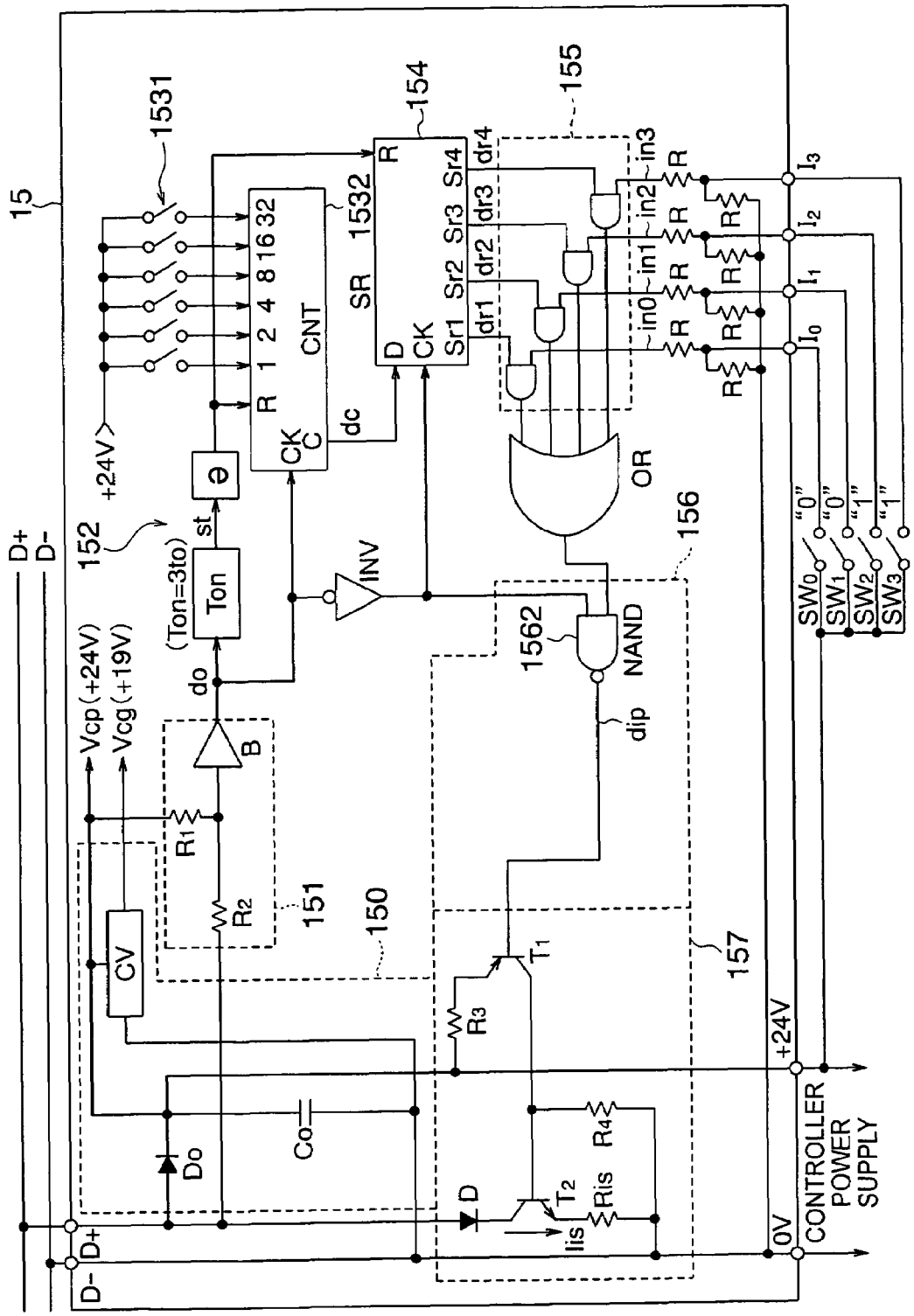
FIG. 6 is a block diagram of an example of a child-station input unit.
Figure 7:
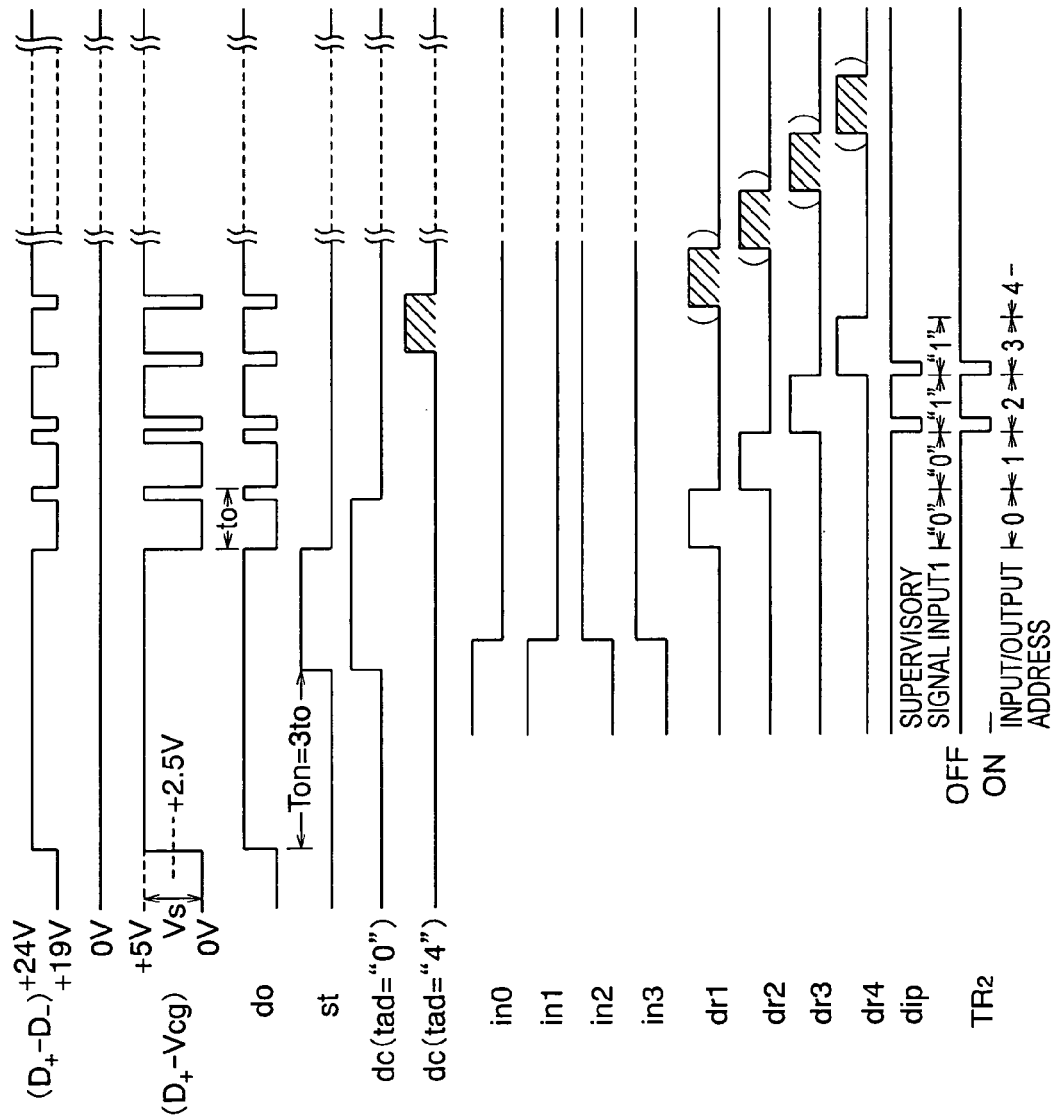
FIG. 7 is a waveform chart of signals in the child-station input unit shown in FIG. 6.
Figure 8:
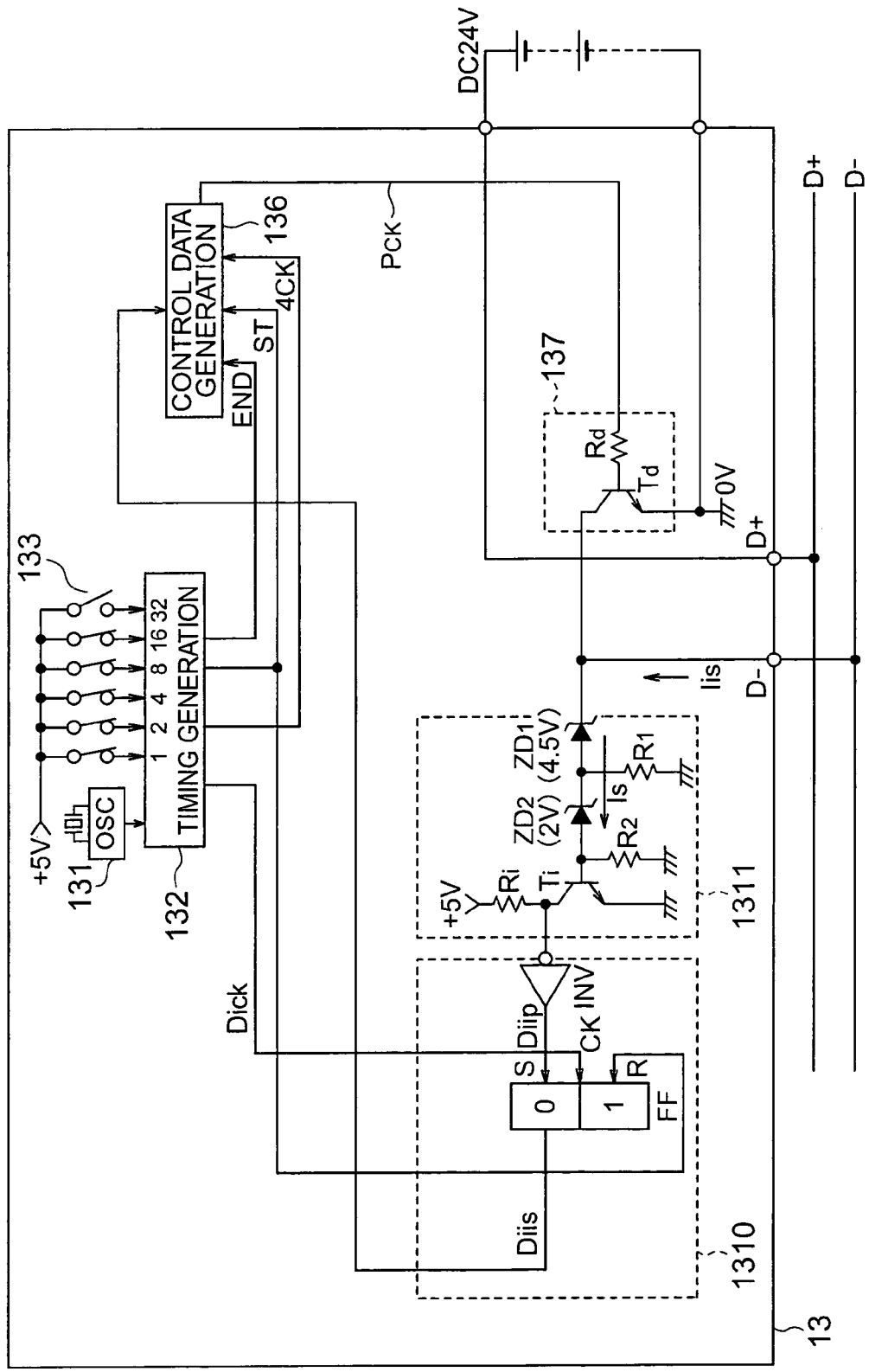
FIG. 8 is a block diagram of an example of an intermediate station.
Figure 9:
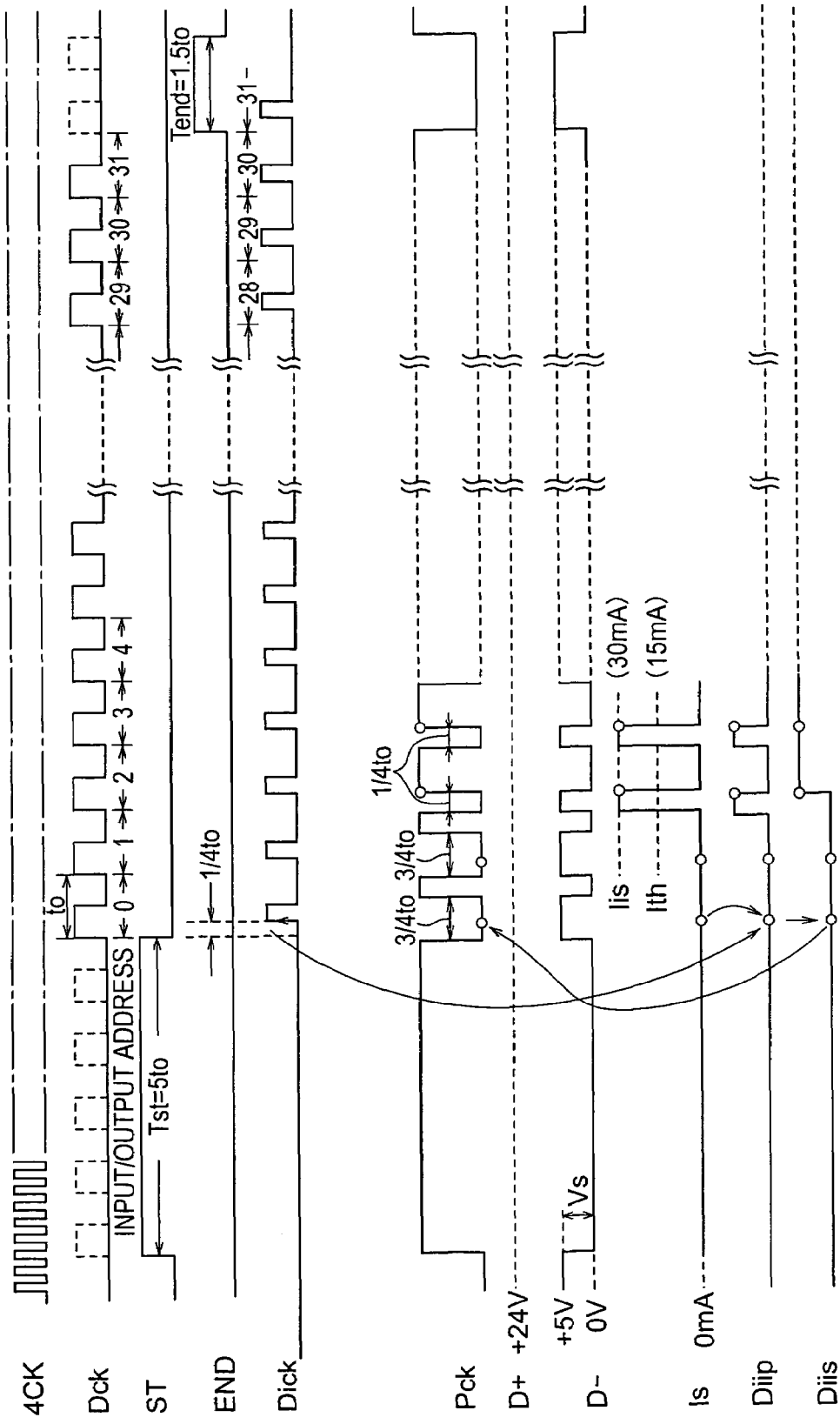
FIG. 9 is a waveform chart of signals in the intermediate station shown in FIG. 8.
Figure 10:
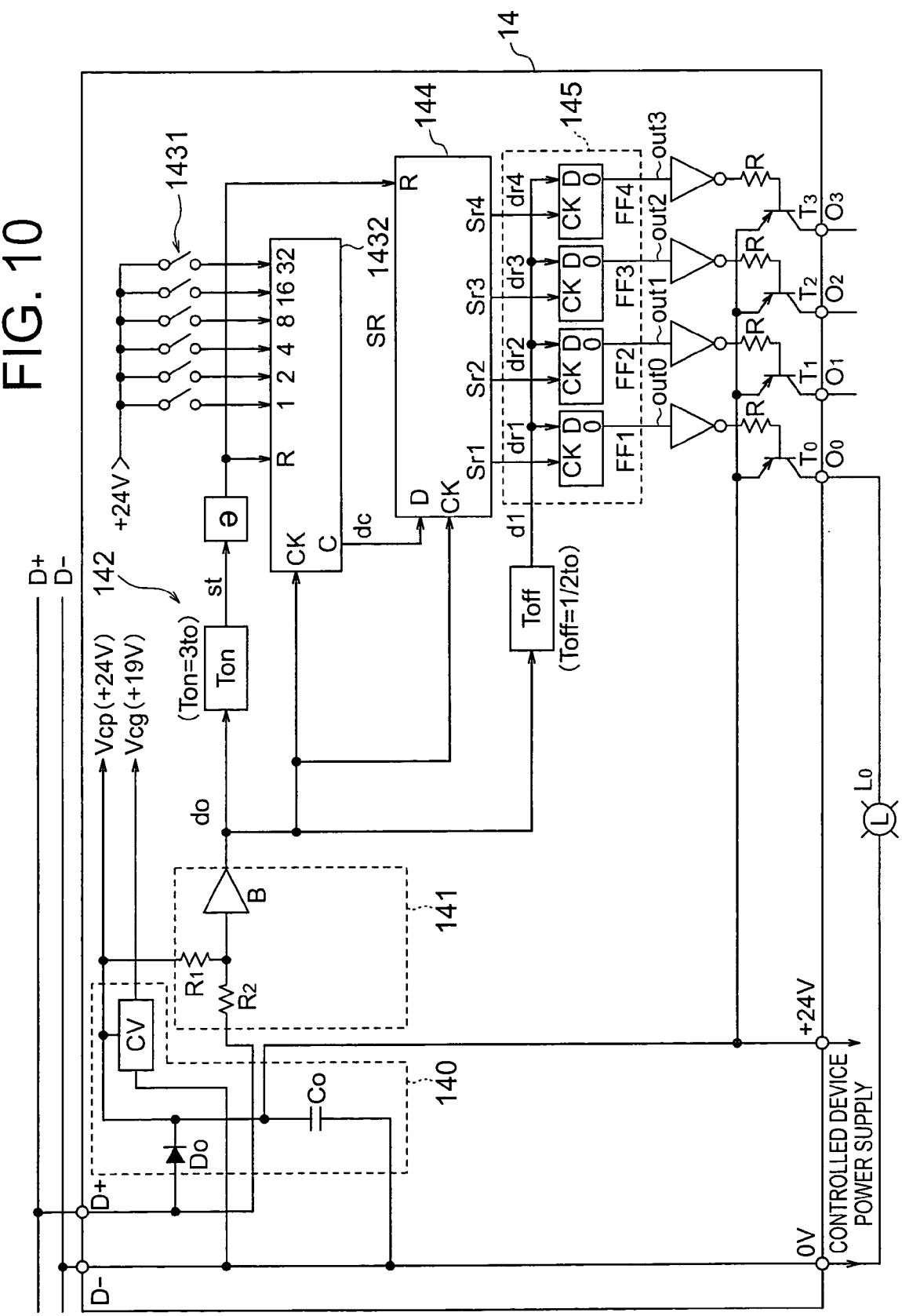
FIG. 10 is a block diagram of an example of a child-station output unit.
Figure 11:
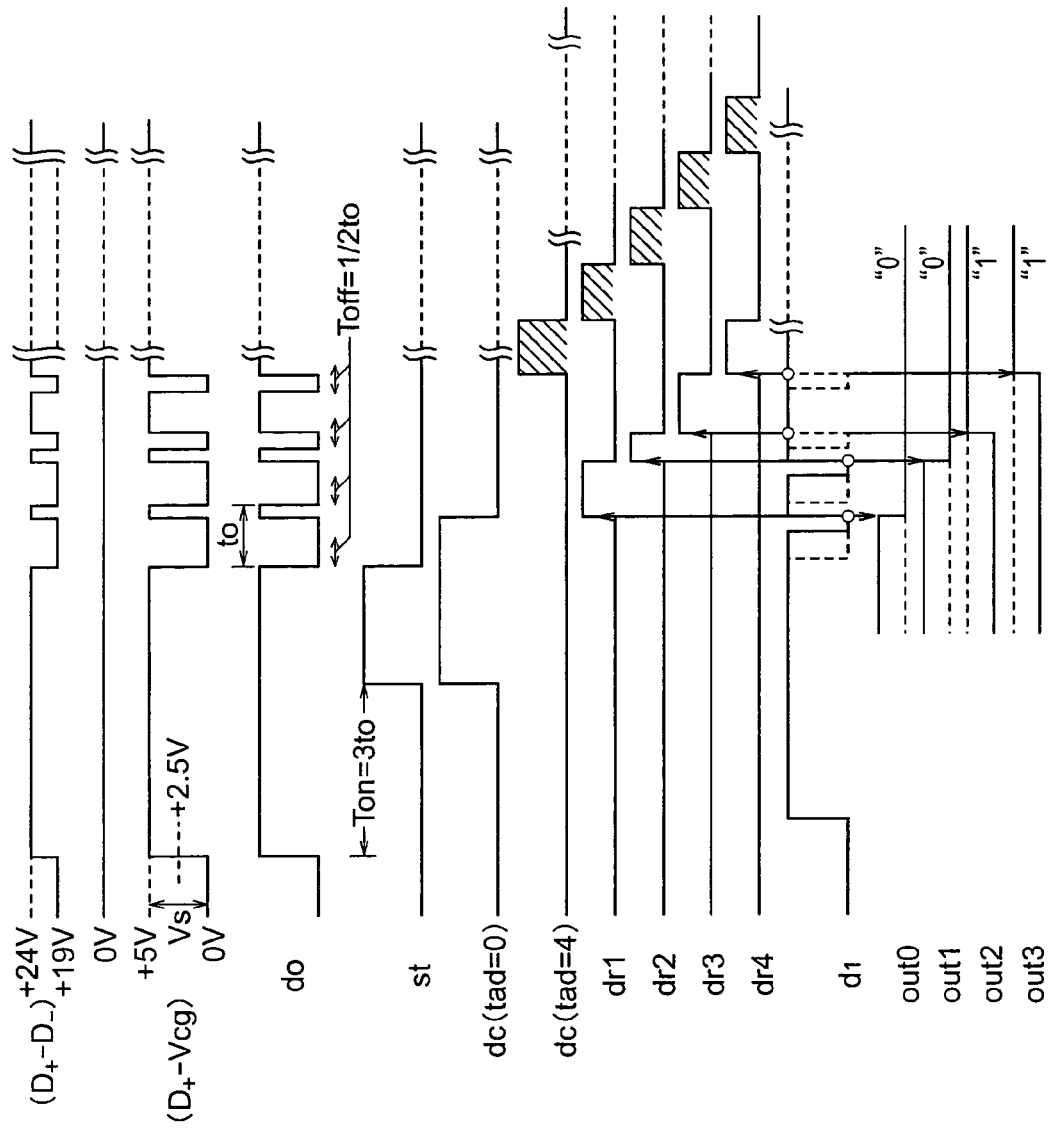
FIG. 11 is a waveform diagram of signal in the child-station output unit shown in FIG. 10.

A specific structure and operation, from the input of a supervisory signal to the output of a control signal, of this example will be described with reference to FIGS. 6 to 11. FIG. 6 is a block diagram showing an exemplary child-station input unit 15. FIG. 7 is a waveform diagram of signals in the child-station input unit 15 shown in FIG. 6. FIG. 8 is a block diagram showing an exemplary intermediate station 13. FIG. 9 is a waveform diagram of signals in the intermediate station 13 shown in FIG. 8. FIG. 10 is a block diagram of an exemplary child-station output unit 14. FIG. 11 is a waveform diagram of signals in the child-station output unit 14 shown in FIG. 10. The waveforms of signals transmitted bidirectionally in this example are the same as those in FIG. 2.

Firstly, the child-station input unit 15 will be described. In FIGS. 6 and 7, a signal on a first data signal line D+ is inputted mainly into a line receiver 151. A power-supply voltage generating means 150 is a DC-DC converter, which smoothes and stabilizes the voltage of the first and second data signal lines D+ and D– with well-known means to produce an output Vcg (19 V) and also produce an output Vcp (24 V) with a diode D0 and a capacitor C0. The periodicity of a pulse-modulated clock on the first and second data signal lines D+ and D– is chosen such that the stabilized output Vcp can be well maintained at 24 V. The child-station input unit 15 (and the child-station output unit 14) operates between the output Vcg (19 V) and the output Vcp.

The line receiver 151 has dividing registers R1 and R2 which have the same register value and a buffer circuit B. The line receiver 151 detects the potential difference between the first and second data signal lines D+ and D–, more precisely, the potential difference Vs between the high and low levels of a pulse voltage as described earlier, divides it into two through the dividing registers R1 and R2, and outputs the resulting signals through the buffer circuit B. In particular, when the potential difference between the first and second data signal line D+ and D– is 24 V, the diode D0 is turned on by the potential of 24 V on the first data signal line D+. As a result, the capacitor C0 is charged to that potential difference, the output Vcp=24 V is provided to the one end of register R1, and the potential of 24 V on the first data signal line D+ is also provided to one end of register R2. Therefore, no potential difference exists across the registers R1 and R2. On the other hand, when the potential difference changed to 19 V, the diode D0 is turned off and the potential Vcp with respect to the potential on the second data signal line D– is maintained at 24 V by the capacitor C0. And, 19 V on the first data signal line D+ is provided, which is at the one end of the register R2. Accordingly, a potential difference of 5 V is provided across the registers R1 and R2 and that potential difference divided into two is inputted into the buffer circuit B. This is caused by an overall potential shift and therefore the relationship between the output Vcp (24 V), which is the reference potential, and the output Vcg (19 V) does not change.

Thus, the child station 11 is equal to the circuit in which the capacitor C0 is virtually connected between the first and second data signal lines D+ and D– in parallel and the diode D0 is virtually connected between the D+-side terminal of the capacitor C0 and the signal line D+. Therefore, a charge current flows from the signal line D+ to the signal line D– through the diode D0 to charge the capacitor C0 and drive the circuit of the child station 11 and the controlled device 12, during a period in which the potential difference between the signal lines D+ and D– is the power-supply potential Vx=24 V. During a period in which the potential difference is (Vx–Vs)=19 V, the diode D0 is turned off and accordingly a charge current for the capacitor C0 does not flow from the signal line D+ to the signal line D– (it is shut off). During the period in which the potential difference is (Vx–Vs), the capacitor C0 discharges to drive the circuit of the child station 11 and controlled device 12 and, when a supervisory data signal is "1," for example a current signal is superimposed, as will be described later. That is, a current Iis, which is the supervisory data signal "1", is outputted onto the signal line D–.

Consider a control signal (addresses 0 to 31) on which a clock CK is superimposed (a serial pulse voltage signal). The buffer circuit B outputs a high-level signal when the potential difference is 24 V, otherwise it outputs a low-level signal. This is a signal "do", which is the data value of the demodulated control signal. It can be assumed that the signal contains the phase-modulated clock CK. The signal do generated according to an output from the line receiver 151 is inputted into a preset forward counter 1532 and its inversion signal is inputted into a shift resistor 154. The waveform of the signal do represents the waveform of the clock CK that is pulse-width modulated (PWM) according to the control signal (addresses 0 to 31), as shown in FIG. 11. The high-level value of the signal do is 5 V.

Prior to this, a start signal ST is detected as the high-level of the signal do and inputted into an on-delay timer Ton. The delay of the timer Ton is 3t0. In particular, the rising edge of an output "st" is delayed by 3t0 and the falling edge of the output st is brought into synchronization to the original signal ST by the timer Ton. Therefore, the period of time for which an end signal END or clock signal CK is high is short, and consequently the output st does not appear. The output st is inputted into a differential circuit ∂ and a differential signal is inputted into the preset forward counter 1532 and the sift resistor (SR) 154 at the rising edge of the output st and used as their reset signals R. Also inputted them is the signal do (therefore the clock CK extracted).

When the child station 11 is located at location A as described above (in FIG. 3), the addresses allocated to the child-station input unit 15, for example addresses 0 to 3 (for convenience, only address 0 is shown in FIGS. 6 and 10), are set in a setting unit 1531 of the child-station setting means 153. Addresses 4 to 7 are allocated to the child-station input unit 15 at location B, as described above. The preset forward counter 1532 of the child-station address setting means 153 is reset by the differential signal at the rising edge of the output st. After the resetting, the preset forward counter 1532 starts counting extracted clocks CK at its rising edge and continues to provide an output "dc" while the count value matches an address in the setting unit 1531. In other words, the output dc is forced high in synchronization with the rising edge of the clock CK in the address period one address period before the current address and forced low in synchronization with the rising edge of the clock CK at the current address. For address 0, it is forced high in synchronization with a rising edge of the output st, as shown in FIG. 7. For reference, the high-level periods for address 4 are shown as shaded areas. It can be seen that the timing is delayed by one clock. The output dc is inputted into the shift resistor 154.

The shift resistor 154 shifts "1 (or the high level)" in synchronization with the rising edge of the extracted clock CK, during a period in which the output dc is high. In other words, "1" is shifted in the unit circuits Sr1 to Sr4 of the shift resistor 154, in that order. Consequently, outputs dr1 to dr4 from the shift resistor 154 are forced high-level in that order in synchronization with the rising edge of the clock CK cycle (until the rising edge of the next cycle). The outputs dr1 to dr4 are inputted into four two-input AND gates.

The input data unit 155 has four (or the plural), which is the same number of the allocated addresses 0 to 3, two-input AND gates and OR gates that receive outputs from these AND gates. As shown in FIG. 6, the outputs dr1 to dr4 from the shift resistor 154, which is the address extracting means 154, are inputted into the four AND gates. The outputs dr1 to dr4 are forced high in sequence in synchronization with the rising edge of the clock cycle maintained high (until the rising edge of the next cycle). Accordingly, in the period in which each of the outputs dr1 to dr4 is high, each of the four AND gates opens, and a supervisory signal (signal according to the input of "0" or "1" which depends on the status of a sensor unit 17 such as a switch SW0) to be superimposed on addresses 0 to 3 is outputted from the OR gates through the AND gates in that order. The supervisory signal at addresses 0 to 3 corresponds to the control signal at addresses 0 to 3.

The outputs from the OR gates are inputted into a two-input NAND gate 1562. Also inputted into the NAND gate 1562 is an output from an inverter INV, namely, the inversion signal of the signal do. The NAND gate 1562 constitutes the supervisory data signal generating means 156. The supervisory signal (addresses 0 to 3) may take a value "0011", for example, during periods in which the outputs dr1 to dr4 are high, as shown in FIG. 7. Accordingly, the NAND gate 1562 opens in synchronization to the rising edge of the signal do, and then the supervisory signal (addresses 0 to 3) which obtains the value "0011" is outputted as an output "dip", during a period in which the supervisory signal (addresses 0 to 3) is outputted.

The output dip is level-converted and then outputted onto the first and second data signal lines D+ and D− through the line driver 157. The line driver 157 has transistors T1 and T2, a diode D, and resistors R3, R4, and Ris. The output dip is inputted into the larger transistor T2 through transistor T1. In particular, when the supervisory data signal is "1", for example, transistor T2 is turned on by the low-level output dip, thereby the current Iis, which is the supervisory data signal, flows to the first and second data signal lines D+ and D−. Thus, the current signal Iis, which is the supervisory data signal "1", is superimposed on the signal line D−. Current passing through transistor T2 is limited to 30 mA, for example, by selecting one of the resistors R3, R4, and Ris appropriately.

As can be seen from the foregoing description, the child-station input unit 15 outputs (superimposes) the supervisory signal onto the first and second data signal lines D+ and D− during one cycle of the (extracted) clock "do". As described earlier, no charge current for the capacitor C0 flows from the signal line D+ to D− during a period in which the potential difference between the first and second data signal lines D+ and D− is (Vx−Vs)=19 V, because the diode D0 is turned off. Therefore, the supervisory data signal does not collide with the charge current from the intermediate station 13.

The intermediate-station input unit 139 will be described below. In FIGS. 8 and 9, a supervisory signal outputted onto the first and second data signal lines D+ and D− is inputted into the supervisory signal detecting means 1311 and detected in it. The detected signal is inversed and outputted as a signal Diip. The waveform of the signal Diip contains only the supervisory data signal. On the signal Diip, supervisory signal data that is associated with the address position of the supervisory signal data exist at the address position one address delayed the corresponding address position on the associated control signal.

The intermediate-station input unit 139 includes current detecting circuit for detecting a current change on the first and second data signal lines D+ and D− and outputting the result as the supervisory signal detecting means 1311. The current detecting circuit includes a transistor Ti, Zener diodes ZD1 and ZD2, and resistors R1, R2, and Ri. Due to the Zener diode ZD1, which has a breakdown voltage of 4.5 V, together with resistor R1, the amplitude is limited to 5 V=Vs. The transistor Ti detects a current Is shown in FIG. 8. In particular, during a period in which the potential difference between the signal lines D+ and D− is (Vx−Vx)=19 V, a charge current for the capacitor C0 does not flow from the signal line D+ to the signal line D−, as described earlier, and the detection current Is flows to the supervisory signal detecting means 1311. When the supervisory data signal is "1" at this time, the is current is superimposed on it. Therefore, the current Iis=30 mA flows as the detection current Is of the supervisory data signal. The Zener diode ZD2 breakdowns when a current larger than 15 mA flows. This is the threshold Ith to detect the current Is. Thus, the transistor Ti is turned on by the detection current Is=30 mA flowing because of the supervisory data signal "1." When the supervisory data signal is "0," the current Iis does not flow and therefore the detection signal Is of the supervisory data signal does not flow. Accordingly, the Zener diode ZD2 does not breakdown and the transistor Ti is turned off by the supervisory data signal, "0."

The detection current Is (=30 mA), which is supervisory data signal "1," is converted into a voltage signal through a voltage drop in the corrector resistor Ri and the voltage signal is provided to the supervisory data extracting means 1310. A signal Diip is generated through the inverter INV according to the detection current Is and inputted into an RS flip-flop FF in the supervisory data extracting means 1310. A timing generating means 132 provides a signal Dick, which is a pulse whose rising edge is delayed by ¼ period (¼t0) from the clock CK, to the RS flip-flop FF as its clock. Consequently, the signal Diis outputted from the flip-flop FF starts providing a supervisory signal data alone at the timing delayed by ¼ period from the original clock CK and continues providing it for a period equal to ¾ periods of the clock CK.

The signal Diis is not provided to a controller or the like. Instead, the signal Diis is inputted into the control data signal generating means 136 in the intermediate-station output unit 135. Consequently, the control data signal generating means 136 receives the signal Diis in the same cycle of the original clock CK. Thus, eventually a 32-bit supervisory signal (addresses 0 to 31) is provided as "0011 . . . ", for example.

The intermediate-station output unit 135 will be described below. In FIGS. 8 and 9, the timing generating means 132 generates a start signal ST, a predetermined number of clocks CK, and an end signal END. The start signal ST is outputted (forced high) for a predetermined period of time (3t0 or longer). The output period of the start signal ST is set to 5t0 in order to distinguish it from the clock CK. Here, t0 is one cycle of the clock CK. The clock CK is generated so as to have a predetermined cycle by dividing an oscillation output from the oscillator 131. As shown on the output Dck, the clock CK is started to be outputted after the start signal ST, that is, in synchronization with the falling edge of the start signal ST, and a predetermined number of clocks CK (the number of the addresses) are outputted. For that purpose, the timing generating means 132 has count means (not shown). The count means starts counting at the rising edge of the start signal ST. When the count output form the count means reaches a predetermined value, the output of the clock CK is stopped. The end signal END is outputted immediately after the predetermined number of the clocks CK (the number of the addresses) are detected. For that purpose, the timing generating means 132 has comparator means (not shown). The comparator means compares the count output from the count means with an address set in the intermediate-station address setting means 133. When the output matches the address, the end signal END is outputted for a predetermined period of time. The output period of the end signal END is set to 1.5t0 in order to distinguish it from the clock CK. The end signal END resets the count means. The start signal ST is outputted again in synchronization with the end of the end signal END and the operation described above is repeated. The maximum number of addresses is the value corresponding to data values transmitted during one transmission cycle (from one start signal ST to the end signal END that follows it), which are the addresses allocated to the intermediate station 13 (the addresses in the intermediate-station address setting means 133). One data value corresponds to one clock.

For example, when the addresses (the number of data values of the control signal mentioned above) are addresses 0 to 31, a 32-bit control signal is outputted onto the signal line "Pck". Alternatively, the addresses may be 0 to 63, 127, 255, . . ..

The output Diis is forced high (or "1") or low (or "0") every clock depending on the data value of the supervisory signal. Thus, it is outputted as "0011 . . . ", for example. The output Diis is provided to the control data signal generating means 136. The start signal ST and end signal END are also provided to the control data signal generating means 136.

The input of the 32-bit control signal is switched (updated) in synchronization with the start signal ST, for example. The maximum address (address 31) is set in the intermediate-station address setting means 133. This allows the end signal END to be provided onto the signal line Pck on completion of processing of the data at address 31 of the control signal. The intermediate-station address setting means 133 closes five weighted switches for five digits, starting from the left, as shown in FIG. 8, to generate the high-level signal "111110" to set address 31 (the same applies to other addresses).

The timing generating means 132 divides an oscillation output from the oscillator 131 to generate a clock 4CK having a frequency (4f0) which is four times higher than the frequency f0 of the clock CK. The control data signal generating means 136 uses a counter (not shown) to counts clocks 4 CK and, when the value (signal Diis) of the control signal (addresses 0 to 31) is "1," outputs a "high-potential low-level" signal only in the first one clock 4CK cycle onto the first data signal line D+ and outputs a high-level Vx signal in the remaining three clock 4CK cycles. On the other hand, when it is "0," the control data signal generating means 136 outputs a "high-potential low-level" signal in the first three clock 4 CK cycles and outputs a high-level Vx signal only the remaining one clock 4CK cycle. Thus, the control data signal generating means 136 pulse-width-modulates (PWM) the clock CK according to the control signal (addresses 0 to 31).

The output from the control data signal generating means 136 is a binary (5 V high level and 0 V low level) signal, which is provided onto one signal line Pck. The signal provided onto the signal line Pck is inputted into the line driver 137 and then onto the first and second data signal lines D+ and D−. The line driver 137 is formed by a large transistor Td for supplying a charge current, which will be described later, and enables low-impedance driving. The amplitude of the output of the line driver 137 is limited to the range between 0 V and 5 V by the Zener diode ZD1 (having a breakdown voltage of 4.5 V). The line driver 137 outputs the inversion signal of the signal line Pck to the second data signal line D−. Provided onto the first data signal line D+ is the power-supply potential Vx=24 V. Therefore, the signal between the first and second data signal line D+ and D− is a binary (level Vx and "high-potential low-level") signal. Between the first and second data signal lines D+ and D−, the start signal ST is provided as the power-supply voltage Vx signal and the end signal END is provided as the "high-potential low-level" signal.

As can be seen from comparison with FIGS. 5 and 6, the components from power-supply voltage generating means 140 to address extracting means 144 in FIGS. 10 and 11 are substantially the same as the components from the power-supply voltage generating means 150 to the address extracting means 154. When this is the child-station output unit 14 at location B described earlier, the same addresses as those allocated to the child-station input unit 15 at location A (addresses 0 to 3 in this example) are allocated to the child-station output unit 14. As many data values of a supervisory signal as the number (four) of extracted control signal data values are inputted.

A signal do is inputted into an off-delay timer Toff, which in turn outputs a signal d1. The off-delay timer Toff outputs the signal only in an off (low-level) period with a predetermined delay. In particular, the falling edge of the input do is delayed and its rising edge is brought into synchronization to the original input do. The delay is set to ½t0. Therefore, when the data value of the control data signal is "1," the high-potential low level of the signal d1 does not appear (the signal remains high) in the first ¼ period of the clock because the off period is short. When the value is "0," the "high-potential low level" in the first ¾ period of the clock remains because the off period is long. That is, the "high-potential low-level" appears on the signal d1 in (¾-½)=¼ period.

Outputs dr1 to dr4 from the shift resistor 144 are forced high in sequence in synchronization with the rising edge of the clock CK cycle and maintained high (until the rising edge of the next cycle), in a manner similar to the one described earlier. The outputs dr1 to dr4 are inputted as clocks into a D-type flip-flop circuits FF1 to FF4, respectively. The signal d1 (or the data value of the demodulated control signal) is inputted into the flip-flop circuits FF1 to FF4, which form an output data unit 145. For example, flip-flop circuit FF1 receives the value of the signal d1 at that time point, in synchronization with the rising edge of the output dr1 and holds and outputs it. In this example, it outputs a low-level signal. Similarly, the other flip-flop circuits FF2 to FF4 receive the value of the signal d1 at that time point, and hold and output it. Thus, the data value "0011" of the control signal at addresses 0 to 3 is demodulated as signals out0 to out3.

The signals out0 to out3 are inverted and then provided as outputs O0 to O3 to the controlled unit 16 in the controlled device 12 through large driving transistors T0-T3, the emitters of which are connected to capacitors C0, to control a load L0. Power is supplied to the load L0 from a child-station output unit 14 as described earlier.

The present invention has been described with respect to embodiments thereof, but various variations may be possible without departing from the spirit of the present invention.

For example, variations of the idea of conceptually dividing every clock CK cycle (in the same cycle) into two, the first half (input period, i) and the last half (output period, o), and using the input period for inputting a supervisory signal and the output period for outputting a control signal can be used. In the control and supervisory signal transmission system according to the present invention, a control signal to a child-station output unit 14 in the output period may be turned on or off depending on the on or off state of a supervisory signal from a child-station input unit 15 in the input period. Consequently, the input period is followed by the output period without any overlap. And, the supervisory signal and control signal are apparently transmitted one clock CK cycle in the two directions, but in fact they are transmitted separately in the input period and output period. The length of the input and output periods are not limited to ½t0. They are not necessarily required to be the same length.

Every clock cycle may be divided into at least two periods, an input period followed by an output period and an intermediate-station input unit 139 extracts a supervisory data signal superimposed on signals transmitted through the data signal lines D+ and D− in the input period (i) in every clock CK cycle. An intermediate-station output unit 135 obtains the supervisory signal as a control signal and superimposes a control data signal on a serial pulse voltage signal and provides it onto data signal lines D+ and D1 in the output period (o) in every clock CK cycle.

Figure 12A:
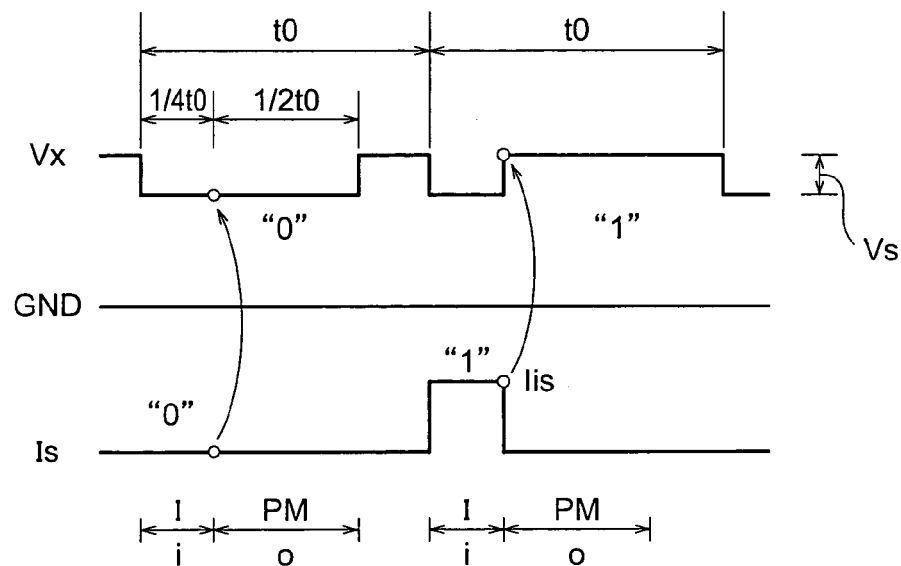
FIGS. 12A, 12B, and 12C are diagrams illustrating signal transmission according to another embodiment of the present invention.

In this respect, the embodiment described above is an example in which a supervisory signal, which is a current signal (I), is superimposed on a clock containing a power-supply voltage Vx in an input period (i) which is the first ¼t0 of the clock cycle and a pulse-width-modulated (indicated as PM) control signal is superimposed on the clock in an output period (o), which is the next ½t0 of the clock cycle, as shown in FIG. 12A. Alternatively, examples shown in FIGS. 12B and 12C may be used. FIG. 12A shows a typical example in which a supervisory signal is in the "off state or 0" and the supervisory signal is in the "on state or 1" (The same applies to examples shown in FIGS. 12B to 15). The voltage level of a current signal in the period in which the current signal is superimposed is set to a high-potential low-level (19 V) (the same applies to the examples shown in FIGS. 12B to 15).

Figure 12B:
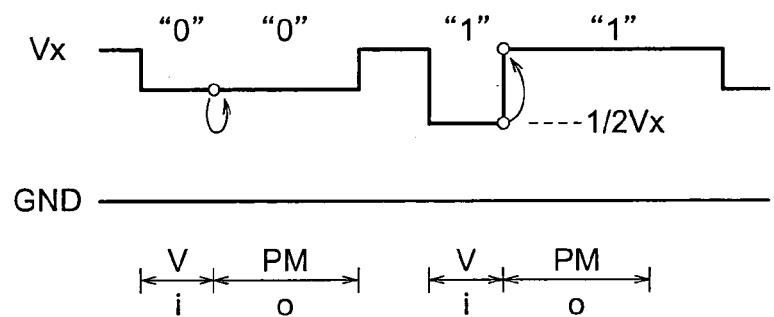

As shown in FIG. 12B, a supervisory signal may be inputted in an input period (i), which is a voltage signal (V), and a control signal may be outputted through pulse-width-modulation (PM) in an output period (o). In this case, the supervisory signal is turned off because of the "high-potential low-level" (19 V) in an input period, and the pulse width (high-potential low-level (19 V) period) is set to ¾ t0, and consequently the control signal is turned off in an output period. The supervisory signal is turned on by a voltage of ½ Vx (12 V) in an input period, the pulse width is set to ¼t0, and consequently the control signal is turned on in an output period.

Figure 12C:
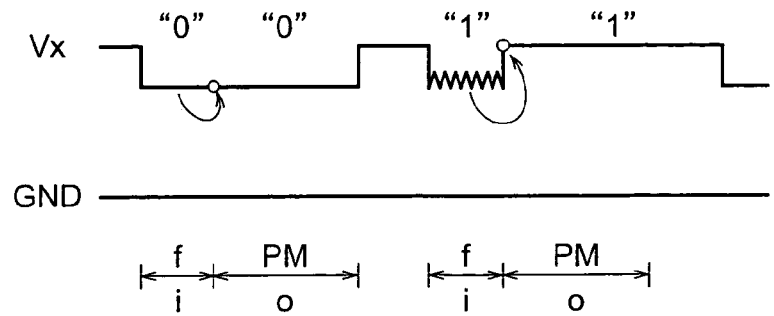

As shown in FIG. 12C, a supervisory signal may be inputted as a frequency signal (f) in an input period (i) and a control signal may be outputted through pulse-width-modulation (PM) in an output period (o). In this case, the supervisory signal is turned off by the frequency "0" of the frequency signal in an input period, the pulse width is set to ¾t0, and consequently the control signal is turned of in an output period. The supervisory signal is turned on by the frequency "f (several kilohertz, for example) of the frequency signal in an input period, the pulse width is set to ¼t0, and consequently the control signal is turned on in an output period. The last ¼t0 of the clock CK is used for transmitting a power-supply voltage Vx (the same applies to the example in FIG. 12A).

As shown in FIGS. 13 and 14, for example, the first half low-level period of the clock CK may be further divided into two: an input period and an output period, both of ¼t0. The last half of the clock CK, which is a high period, is used to transmit a power-supply voltage Vx.

Figure 13A:
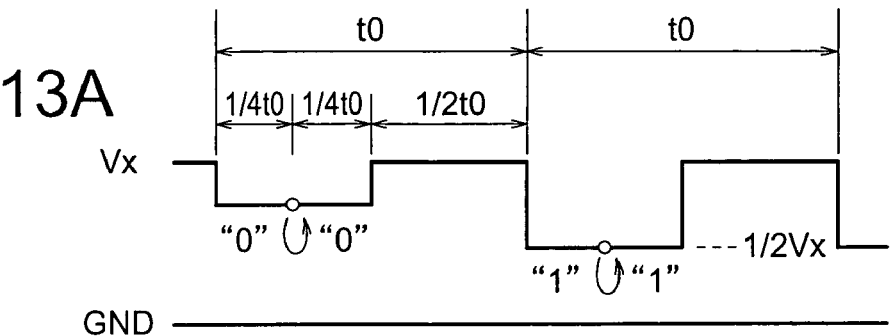
FIGS. 13A, 13B, and 13C are diagrams illustrating signal transmission according to another embodiment of the present invention.

As shown in FIG. 13A, a supervisory signal may be inputted as a voltage signal (V) in an input period (i) and a control signal may be outputted as the voltage signal (V) in an output period (o). In this case, the supervisory signal is turned off by a "high-potential low-level" (19 V) in an input period, and the control signal is turned off by the "high-potential low-level" (19 V) in an output period. The supervisory signal is turned on by a voltage of ½ Vx (12 V) in an input period, and the control signal is turned on by the voltage of ½ Vx (12 V) in an output period.

Figure 13B:
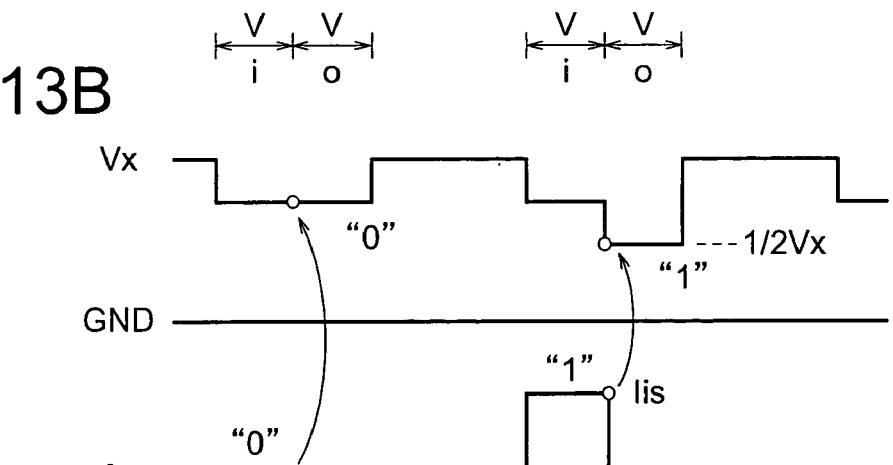

As shown in FIG. 13B, a supervisory signal may be inputted as a current signal (I) in an input period (i) and a control signal may be outputted as a voltage signal (V) in an output period (o). In this case, the supervisory signal is turned off in the absence of the current signal (the current signal lower than a threshold flows) in the input period, and the control signal is turned off by a "high-potential low-level" (19 V) in an output period. The supervisory signal is turned on in the presence of the current signal (the current Iis, for example, higher than or equal to the threshold flows) in an input period, and the control signal is turned on by a voltage of ½ Vx (12 V) in an output period.

Figure 13C:
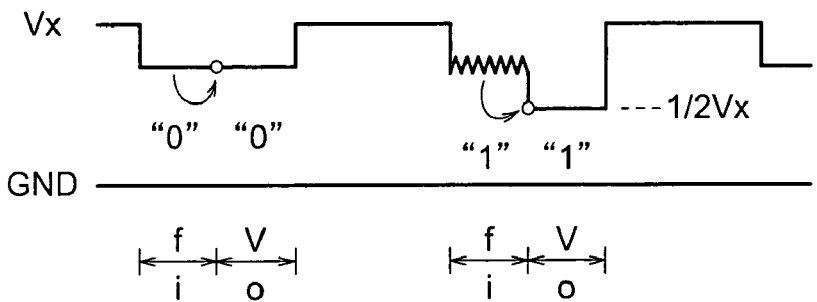

As shown in FIG. 13C, a supervisory signal may be inputted as a frequency signal (f) in an input period (i) and a control signal may be outputted as a voltage signal (V) in an output period (o). In this case, the supervisory signal is turned off by a frequency of "0" of the frequency signal in an input period, and the control signal is turned off by a "high-potential low-level" (19 V) in an output period. The supervisory signal is turned on by a frequency of "f (for example several kilohertz)" of the frequency signal in an input period, and the control signal is turned on by a voltage of ½ Vx (12 v) in an output period.

Figure 14A:
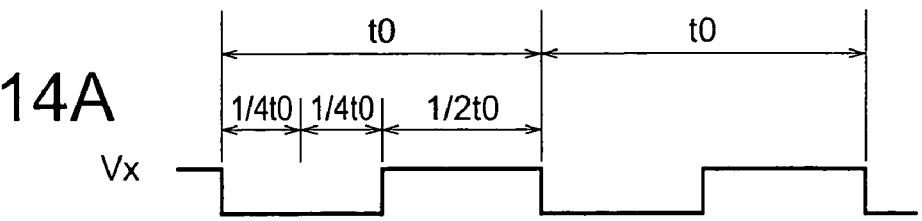
FIGS. 14A, 14B, and 14C are diagrams illustrating signal transmission according to another embodiment of the present invention.

As shown in FIG. 14A, a supervisory signal may be inputted as a current signal (I) in an input period (i) and a control signal may be outputted as a current signal (I) in an output period (o). In this case, the supervisory signal may be turned off in the absence of the current signal (the current signal lower than a threshold flows) in an input period, and the control signal may be turned off by preventing the current signal from appearing (reducing the current signal to the order of a leakage current) in an output period. The supervisory signal is turned on in the presence of the current signal (the current Iis, for example, higher than or equal to the threshold flows) in an input period, and the control signal is tuned on in the presence of the current signal (the current Iis flows) in an output period.

Figure 14B:
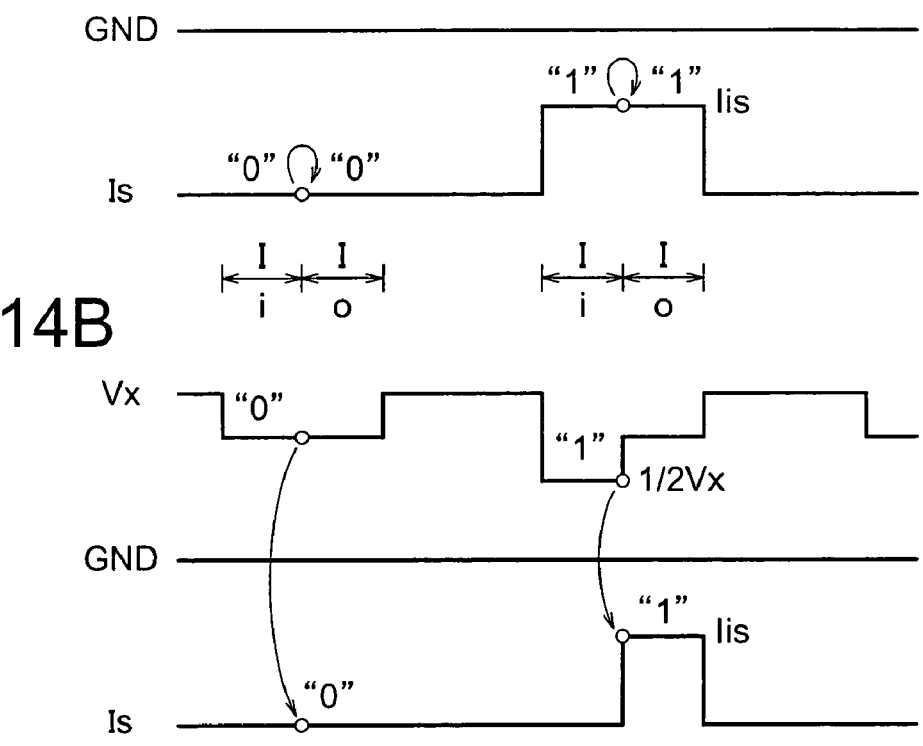

As shown in FIG. 14B, a supervisory signal may be inputted as a voltage signal (V) in an input period (i) and a control signal may be outputted as a current signal (I) in an output period (o). In this case, the supervisory signal is turned off by a "high-potential low-level" (19 V) in an input period, and the control signal is turned off by preventing the current signal from appearing (reducing the current to the order of a leakage current) in an output period. The supervisory signal is turned on by a voltage of ½ Vx (12 V) in an input period, and the control signal is turned on by providing the current signal (flowing the current Iis) in an output period.

Figure 14C:
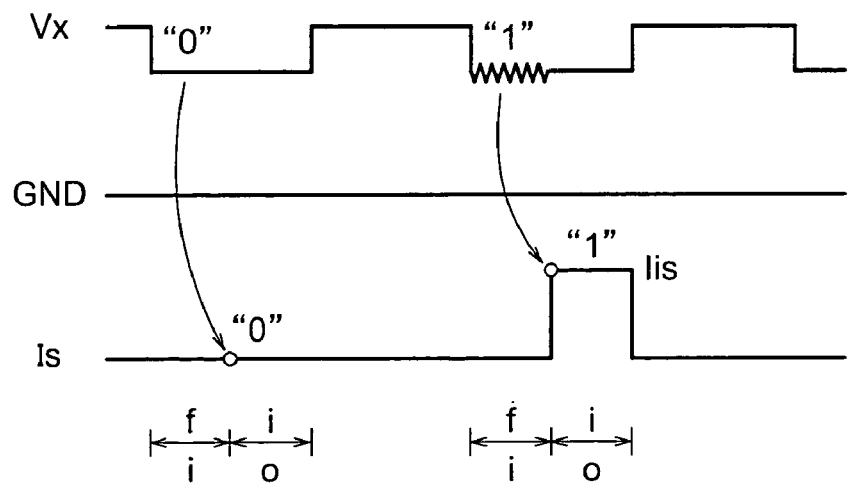

As shown in FIG. 14C, a supervisory signal may be inputted as a frequency signal (f) in an input period (i) and a control signal may be outputted as a current signal (I) in an output period (o). In this case, the supervisory signal is turned off by a frequency of "0" of the frequency signal in an input period, and the control signal is turned off in the absence of the current signal (the current signal is reduced to the order of a leakage current) in an output period. The supervisory signal is turned on by a frequency "f (for example several kilohertz)" of the frequency signal in an input period, and the control signal is turned on by providing the current signal (flowing the current Iis) in an output period.

Figure 15A:
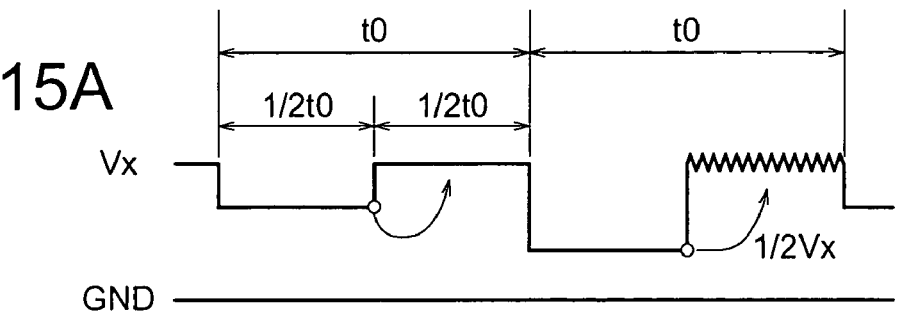
FIGS. 15A, 15B, 15C, and 15D are diagrams illustrating signal transmission according to another embodiment of the present invention.
Figure 15B:
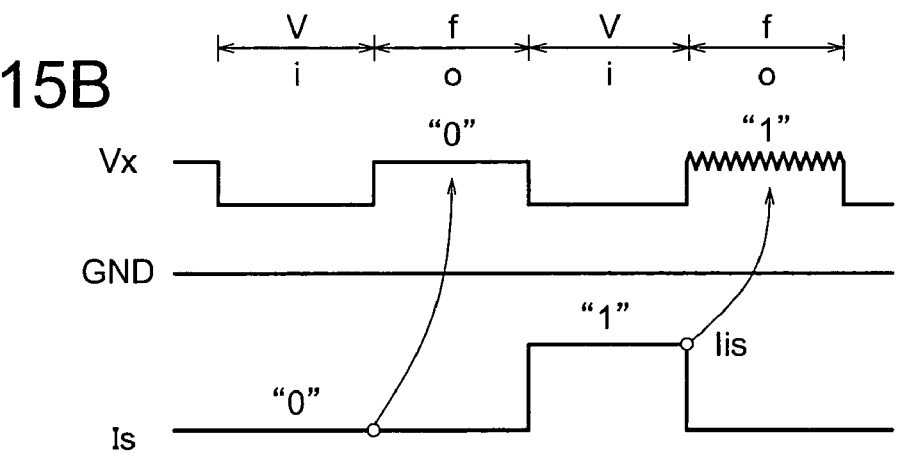

Furthermore, as shown in FIGS. 15A and 15B, the first-half, low-level period of a clock CK may be used as an input period having a length of ½t0, and the last-half, high-level period of the clock CK may be used as an output period having a length of ½t0. A frequency signal is superimposed on the last-half, high-level period of the clock CK and this period is also used for transmitting a power-supply voltage Vx.

As shown in FIG. 15A, a supervisory signal may be inputted as a voltage signal (V) in an input period (i) and a control signal may be outputted as a frequency signal (f) in an output period (o). In this case, the supervisory signal is turned off by a "high-potential low-level" (19 V) in an input period, and the control signal is turned off by a frequency of "0" of the frequency signal in an output period. The supervisory signal is turned on by a voltage of ½ Vx (12 V) in an input period, and the control signal is turned on by the frequency "f (for example several kilohertz)" of the frequency signal in an output period.

As shown in FIG. 15B, a supervisory signal may be inputted as a current signal (I) in an input period (i) and a control signal may be outputted as a frequency signal (f) in an output period (o). In this case, the supervisory signal is turned off in the absence of the current signal (a current signal lower than a threshold flows) in an input period, and the control signal is turned off by a frequency of "0" of the frequency signal in an output period. The supervisory signal is turned on in the presence of the current signal (the current Iis, for example, higher than or equal to the threshold flows) in an input period, and the control signal is turned on by the frequency "f (for example several kilohertz)" of the frequency signal in an output period.

Figure 15C:
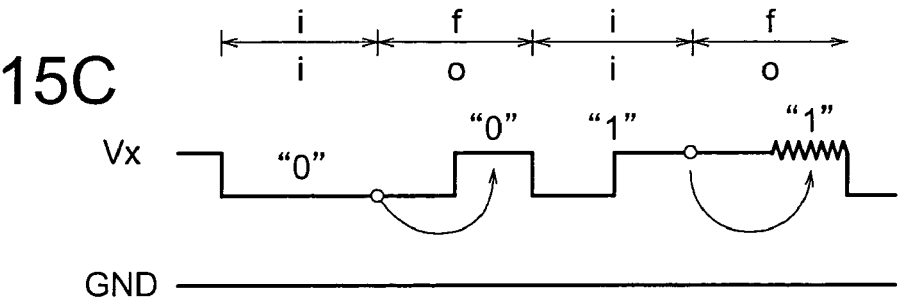

Furthermore, as shown in FIG. 15C, the first $3/4t0$ of a clock CK may be used as an input period, and the last $1/4t0$ of the clock CK may be used as an output period. A frequency signal is superimposed on the last $1/4t0$. This last $1/4t0$ period is also used for transmitting a power-supply voltage Vx. As shown in FIG. 15C, a supervisory signal may be inputted as a pulse-width-modulated (PM) signal in an input period (i), and a control signal may be outputted as a frequency signal (f) in an output period (o). In this case, the pulse width (a "high-potential low-level" (19 V) period) in an input period is set to $3/4t0$, and the control signal is turned off by a frequency of "0" of the frequency signal. The pulse width in an input period is set to $1/4t0$, and the control signal is turned on by the frequency "f (for example several kilohertz) of the frequency signal.

Figure 15D:
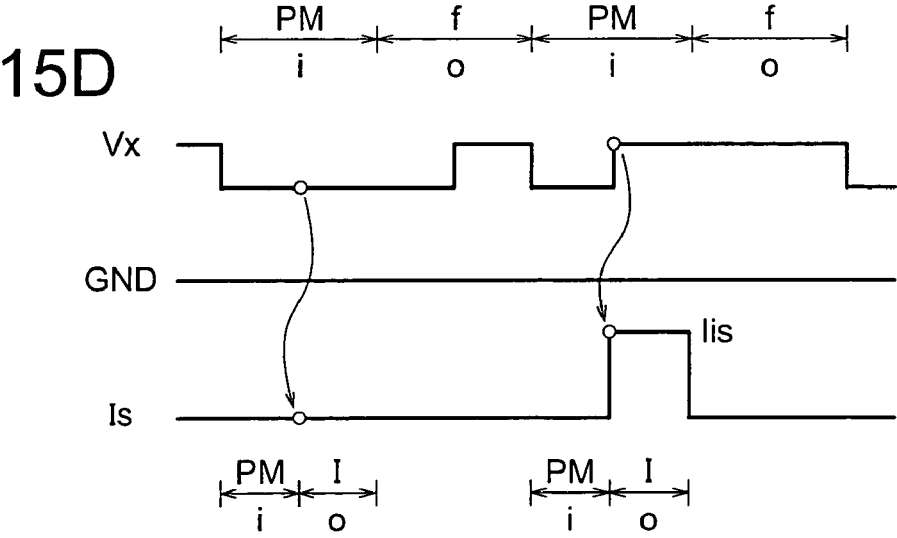

As shown in FIG. 15D, the first $1/4t0$ of a clock CK may be used as an input period, and the $1/4t0$ period that follows the input period may used as an output period. The last $1/4t0$ period is used for transmitting a power-supply voltage Vx. As shown in FIG. 15D, a supervisory signal may be inputted as a pulse-width-modulates (PM) signal in an input period (i), and a control signal may be outputted as a current signal (I) in an output period (o). In this case, the pulse width in an input period (a "high-potential low-level" (19 V) period) is set to $3/4t0$ to prevent the current signal from appearing (reducing the current to the order of a leakage current) to turn off the control signal in an output period. The pulse width in an input period is set to $1/4t0$ to allowing the current signal to appear (to flow the current Iis) in an output period to turn on the control signal. In this example, it can be said that the first $3/4t0$ is an input period and therefore it appears that the input period overlaps an output period. However, an input period is always starts prior to the beginning of an output period.

Figure 16:
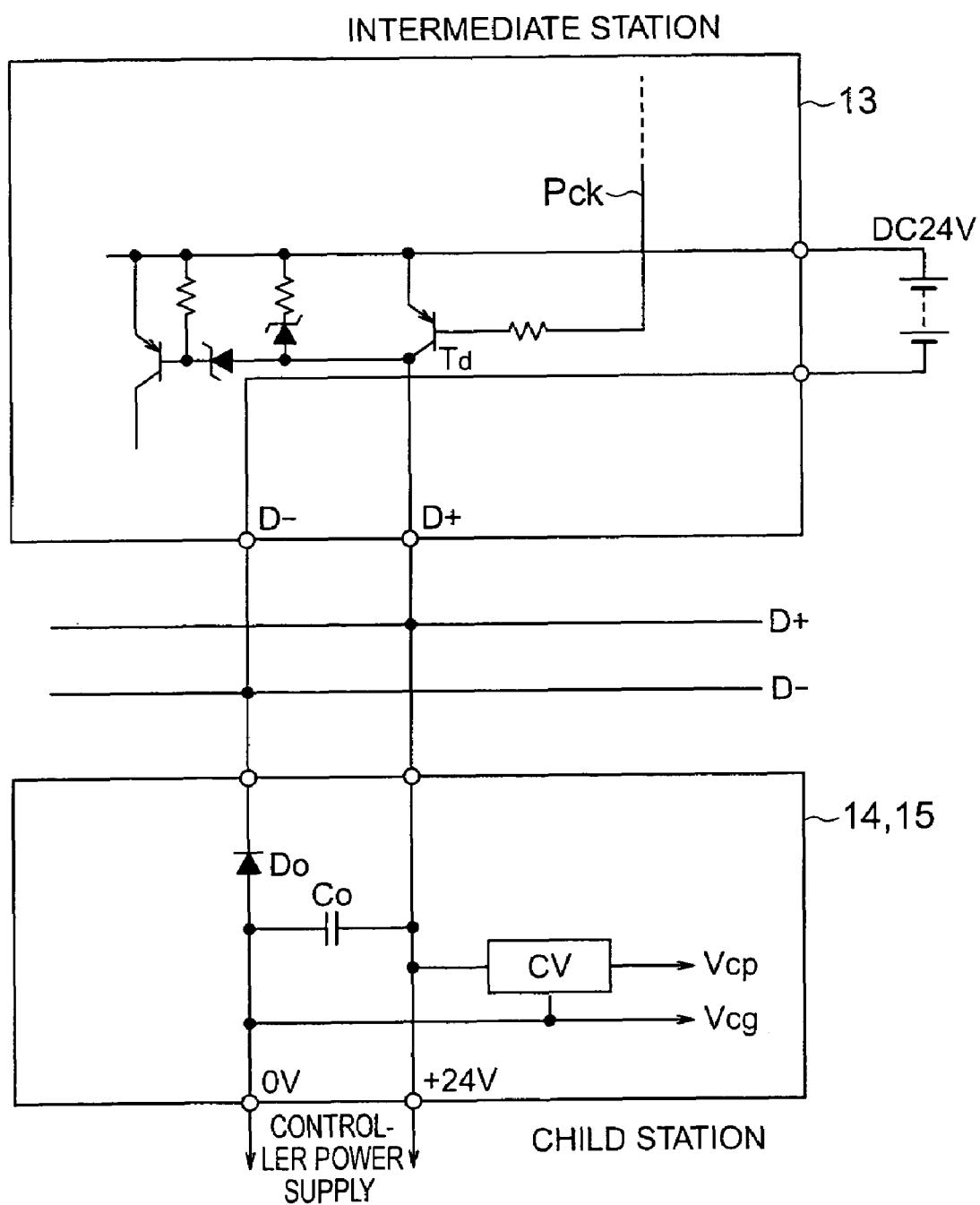
FIG. 16 is a block diagram showing a structure according to another embodiment of the present invention.

Furthermore, changes may be made to the structure of the line driver 137 in the intermediate station 13 as shown in FIG. 16. FIG. 16 shows only part of the structure of the intermediate station 13. In FIG. 16, the npn transistor Td constituting the line driver 137 is replaced with a pnp transistor and the polarity of the connection in the child station 11 (the child-station output unit 14 and the child-station input unit 15) is inversed. This structure provides the same effects as described above.

An error-check circuit may be provided in the intermediate station 13. The error-check circuit supervises the first data signal line D+ to check the conditions (check for failure such as a short circuit) of the line. The structure of the error check circuit may be the one described in Japanese Patent Laid-Open No. 03-006997.

Furthermore, operations in the intermediate station 13 and the child station 11 may be implemented by executing programs that perform the operations described above in a CPU (Central Processing Unit) provided in each of the intermediate station 13 and child station 11.

According to the present invention, an intermediate station is provided in place of a controller and a parent station in a control and supervisory signal transmission system and the intermediate station transfers a supervisory signal from a sensor unit to a controlled unit as a control signal in a simple one-to-one correspondence in the same clock cycle and also superimposes a power supply onto the signal, thereby eliminating the need for a power line.

Furthermore, according to the present invention, an intermediate station is provided in place of a controller and a parent station in an control and supervisory signal transmission system, wherein the intermediate station divides a clock cycle into an input period and an output period that follows the input period and superimposes a supervisory signal from a sensor unit and a control signal to be transmitted to a controlled unit on the input period and output period of the same clock cycle, respectively, and also superimposes a power supply on the clock for transmission, thereby eliminating the need for a power line.

Thus, a simple, small-scale, easy-to-maintain, and inexpensive control and supervisory signal transmission system that replaces the controller and parent station is provided. In addition, fast, virtually bidirectional signal transmission between a controlled unit and a sensor unit can be achieved and a supervisory signal and control signal can be outputted onto a common data signal line and transmitted bidirectional in the system. In other words, in a simple, small-scale, easy-to-maintain, and inexpensive control and supervisory signal transmission system, without need for providing separate periods for transmitting a supervisory signal or control signal through a data signal line, thereby achieving a transfer rate twice as fast as those in conventional systems. Also, the supervisory and control signals can be transmitted into small wiring space in a controlled device.

What is claimed is:

1. A control and supervisory signal transmission system including a plurality of controlled devices, each including a controlled unit and a sensor unit which supervises said controlled unit, said control and supervisory signal transmission system transmitting a control signal to said controlled unit and transmitting a supervisory signal from said sensor unit through a data signal line common to said plurality of controlled devices, said control and supervisory signal transmission system comprising:

an intermediate station being connected to said data signal line and transmitting a supervisory signal sent from a given controlled device to a controlled device associated with said given controlled device as a control signal; and a plurality of child stations being associated with said plurality of controlled devices and being connected to said data signal line and the associated controlled devices, wherein said intermediate station comprises:

timing generating means for generating a predetermined timing signal that is in synchronization with a clock having predetermined periodicity;

an intermediate-station input unit to extract a supervisory signal superimposed on a serial pulse voltage signal transmitted through said data signal line, in every cycle of said clock, under the control of said predetermined timing signal; and an intermediated-station output unit to obtain said supervisory signal as said control signal, to superimpose said control signal on said serial pulse voltage signal according to each data value of said control signal in every cycle of said clock, and to output a resulting signal onto said data signal line in the same cycle in which said supervisory signal has been extracted, under the control of said predetermined timing signal, wherein each of said plurality of child stations comprises:
a child-station input unit to generate a supervisory data signal according to a value from said sensor unit associated with the child station and to superimpose said supervisory data signal on a predetermined position of said serial pulse voltage signal as a data value of said supervisory signal, under the control of said predetermined timing signal; and
a child-station output unit to extract data values of said control signal from said serial pulse voltage signal and to supply data corresponding to the child station from among the data values to said controlled unit associated with the child-station output unit, in every cycle of said clock, under the control of said predetermined timing signal.

2. A control and supervisory signal transmission system including a plurality of controlled devices, each including a controlled unit and a sensor unit which supervises said controlled unit, said control and supervisory signal transmission system transmitting a control signal to said controlled unit and transmitting a supervisory signal from said sensor unit through a data signal line common to said plurality of controlled devices, said control and supervisory signal transmission system comprising:
an intermediate station being connected to said data signal line and transmitting a supervisory signal sent from a given controlled device to a controlled device associated with said given controlled device as a control signal; and
a plurality of child stations being associated with said plurality of controlled devices and being connected to said data signal line and the associated controlled devices,
wherein said intermediate station comprises:
timing generating means for generating a predetermined timing signal that is in synchronization with a clock having predetermined periodicity;
an intermediate-station input unit to extract a supervisory data signal superimposed on a pulse voltage signal transmitted through said data signal line in an input period, said cycle being divided in at least said input period and an output period that follows said input period, in every cycle of said clock, under the control of said predetermined timing signal; and
an intermediated-station output unit to obtain said supervisory signal as said control signal, to superimpose said control signal on said pulse voltage signal in said output period in every cycle of said clock, and to output a resulting signal onto said data signal line, under the control of said predetermined timing signal,
wherein each of said plurality of child stations comprises:
a child-station input unit to generate a supervisory data signal according to a value from said sensor unit associated with the child station and to superimpose said supervisory data signal on said pulse voltage signal in said input period of the clock at a predetermined position as a data value of said supervisory signal, under the control of said predetermined timing signal; and
a child-station output unit to extract data values of said control signal superimposed on said pulse voltage signal in the output period in the cycle and to supply data corresponding to the child station from among the data values to said controlled unit associated with the child-station output unit, in every cycle of said clock, under the control of said predetermined timing signal.

3. The control and supervisory signal transmission system according to claim 1, wherein:
said intermediate-station output unit changes a duty ratio between a period in which said clock is at a non-power-supply-voltage level that is lower than a power-supply voltage level and higher than a high-level signal in the remaining part of circuit and a subsequent period in which said clock is at said power-supply-voltage level according to each data value of a control data signal inputted from said intermediate-station input unit, converts said control data signal into a serial pulse voltage signal, and outputs said serial pulse voltage signal onto said data signal line, in every cycle of said clock, under the control of said predetermined timing signal;
said intermediate-station input unit detects a supervisory data signal superimposed on said serial pulse voltage signal transmitted through said data signal line, extracts each data value from said supervisory data signal, converts the data value into said supervisory signal, and inputs the said supervisory signal into said intermediate-station output unit, in every clock of said clock, under the control of said predetermined timing signal;
said child-station output unit identifies the duty ratio between a period in which said serial pulse voltage signal is at a non-power-supply-voltage level and a subsequent period in which said serial pulse voltage signal is at the power-supply voltage level, extracts data values of said control data signal, and supplies data associated with the child station from among the data values to said controlled unit, in every clock of said clock, under the control of said predetermined timing signal; and
said child-station input unit generates a supervisory data signal according to a value from said sensor unit associated with said child-station input unit and superimposes said supervisory data signal on a predetermined position of said serial pulse voltage signal as a data value of said supervisory signal, under the control of said predetermined timing signal.

4. The control and supervisory signal transmission system according to claim 1, wherein said supervisory data signal has two different current levels, and said intermediate-station input unit detects said supervisory data signal as a current signal to extract data values from said supervisory data signal.

5. The control and supervisory signal transmission system according to claim 1, wherein said intermediate-station output unit sends a charge current to said child-station output unit and said child-station input unit through said data signal line.

6. The control and supervisory signal transmission system according to claim 5, wherein said child-station output unit and said child-station input unit shut off said charge current flowing through said data signal line, in a non-power-supply-voltage level period.

7. The control and supervisory signal transmission system according to claim 6, wherein said child-station input unit outputs said supervisory data signal in a period in which said child-station input unit shuts off said charge current flowing through said data signal line, in said non-power-voltage-level period.

8. The control and supervisory signal transmission system according to claim 5, wherein said child-station output unit and said child-station input unit includes charge means charged by said charge current, and shut off said charge current flowing through said data signal line and discharge said charge means, in a non-power-supply-voltage-level period.

9. The control and supervisory signal transmission system according to claim 1, wherein said data signal line comprises first and second data signal lines, said second data signal line being set at a lowest potential which is a reference potential, said first data signal line being set at a non-power-supply-voltage level or a highest potential which is a power-supply voltage.

10. The control and supervisory signal transmission system according to claim 1, wherein said data signal line comprises first and second data signal lines, said first data signal line being set at a highest potential which is a reference potential, said second data signal line being set at a non-power-supply-voltage level or a lowest potential which is a power-supply voltage.

11. The control and supervisory signal transmission system according to claim 2, wherein:

said intermediate-station output unit changes a duty ratio between a period in which said clock is at a non-power-supply-voltage level that is lower than a power-supply voltage level and higher than a high-level signal in the remaining part of circuit and a subsequent period in which said clock is at said power-supply-voltage level according to each data value of a control data signal inputted from said intermediate-station input unit, converts said control data signal into a serial pulse voltage signal, and outputs said serial pulse voltage signal onto said data signal line, in every cycle of said clock, under the control of said predetermined timing signal;

said intermediate-station input unit detects a supervisory data signal superimposed on said serial pulse voltage signal transmitted through said data signal line, extracts each data value from said supervisory data signal, converts the data value into said supervisory signal, and inputs the said supervisory signal into said intermediate-station output unit, in every clock of said clock, under the control of said predetermined timing signal;

said child-station output unit identifies the duty ratio between a period in which said serial pulse voltage signal is at a non-power-supply-voltage level and a subsequent period in which said serial pulse voltage signal is at the power-supply voltage level, extracts data values of said control data signal, and supplies data associated with the child station from among the data values to said controlled unit, in every clock of said clock, under the control of said predetermined timing signal; and said child-station input unit generates a supervisory data signal according to a value from said sensor unit associated with said child-station input unit and superimposes said supervisory data signal on a predetermined position of said serial pulse voltage signal as a data value of said supervisory signal, under the control of said predetermined timing signal.

12. The control and supervisory signal transmission system according to claim 2, wherein said supervisory data signal has two different current levels, and said intermediate-station input unit detects said supervisory data signal as a current signal to extract data values from said supervisory data signal.

13. The control and supervisory signal transmission system according to claim 2, wherein said intermediate-station output unit sends a charge current to said child-station output unit and said child-station input unit through said data signal line.

14. The control and supervisory signal transmission system according to claim 2, wherein said data signal line comprises first and second data signal lines, said second data signal line being set at a lowest potential which is a reference potential, said first data signal line being set at a non-power-supply-voltage level or a highest potential which is a power-supply voltage.

15. The control and supervisory signal transmission system according to claim 2, wherein said data signal line comprises first and second data signal lines, said first data signal line being set at a highest potential which is a reference potential, said second data signal line being set at a non-power-supply-voltage level or a lowest potential which is a power-supply voltage.

* * * * *